(12) United States Patent
Miyauchi et al.

(10) Patent No.: US 8,144,437 B2
(45) Date of Patent: Mar. 27, 2012

(54) MAGNETORESISTIVE ELEMENT AND THIN FILM MAGNETIC HEAD

(75) Inventors: Daisuke Miyauchi, Tokyo (JP); Keita Kawamori, Tokyo (JP); Takahiko Machita, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 81 days.

(21) Appl. No.: 12/824,725

(22) Filed: Jun. 28, 2010

(65) Prior Publication Data

US 2011/0317313 A1    Dec. 29, 2011

(51) Int. Cl.
*G11B 5/39* (2006.01)
*G11B 5/127* (2006.01)

(52) U.S. Cl. .................................. 360/324.12
(58) Field of Classification Search .......... 360/324, 360/324.1, 324.11, 324.12, 324.2, 327.2, 360/327.23, 327.3, 327.31
See application file for complete search history.

(56) References Cited

U.S. PATENT DOCUMENTS

| | | | |
|---|---|---|---|
| 7,106,560 B2 * | 9/2006 | Hasegawa et al. | 360/324.12 |
| 7,596,854 B2 * | 10/2009 | Cyrille et al. | 29/603.16 |
| 7,623,324 B2 * | 11/2009 | Honda et al. | 360/324.12 |
| 7,652,857 B2 * | 1/2010 | Sato | 360/324.12 |
| 7,808,750 B2 * | 10/2010 | Yanagisawa et al. | 360/324.12 |
| 2009/0034132 A1 | 2/2009 | Miyauchi et al. | |
| 2010/0039734 A1 | 2/2010 | Hara et al. | |

* cited by examiner

*Primary Examiner* — Angel A. Castro
(74) *Attorney, Agent, or Firm* — Posz Law Group, PLC

(57) ABSTRACT

An orthogonalizing bias function part formed at a rear part of an MR part in a DFL structure influencing a substantial orthogonalizing function of first and second ferromagnetic layers in respective magnetization directions thereof, non-magnetic metal layers formed to abut both ends of the MR part in a width direction and separated from both ends of the MR part by respective insulation layers, each of the non-magnetic metal layers being in a two-layer structure configured with a first non-magnetic metal layer positioned at a lower side as a lower layer and a second non-metal layer positioned at an upper side as an upper layer are configured, and relationship R2<R1 is met, where R1 is a milling rate for the first non-magnetic metal layer that is the lower layer, and R2 is another milling rate for the second non-magnetic metal layer that is the upper layer.

11 Claims, 22 Drawing Sheets

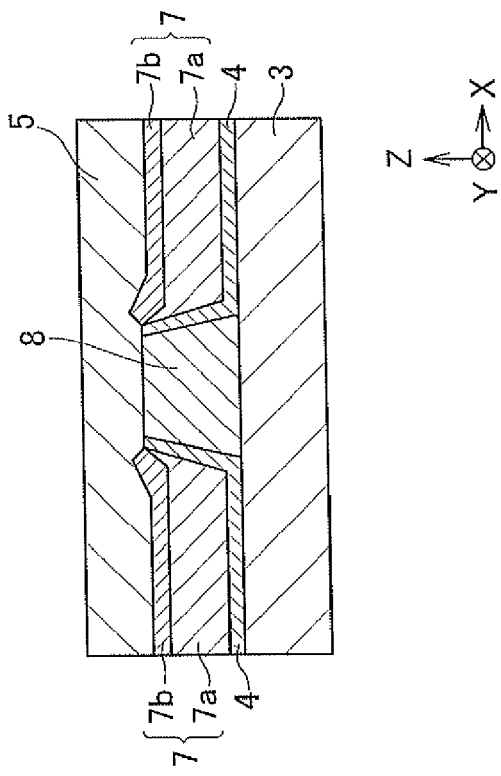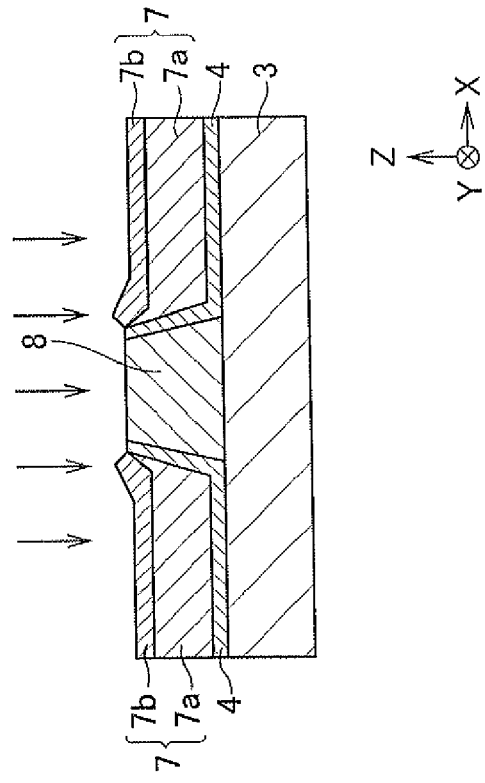

MAGNETORESISTIVE ELEMENT AND THIN FILM MAGNETIC HEAD

BACKGROUND OF THE INVENTION

1. Technical Field of the Invention

The present invention relates to a magnetoresistive effect element in a current perpendicular to plane (CPP) structure that includes two free layers for reading, as a signal, a magnetic field intensity of a magnetic recording medium and the like, a thin film magnetic head having the magnetoresistive effect element, and a head gimbal assembly and a magnetic disk device including the thin film magnetic head.

2. Description of Conventional Art

With the recent increase in a recording density of hard disk drive (HDD), enhancement of performance of the thin film magnetic head has been desired. A composite thin film magnetic head, in which a magnetoresistive effect element (hereinafter may be referred to simply as an MR element) exclusively for reading out signals and an inductive magnetic transducer exclusively for writing signals are laminated, has been widely used as the thin film magnetic head.

Recently, a so-called magnetoresistive effect element in a current in plane (CIP) structure that operates by passing an electric current in parallel with a film surface of an element called a spin-valve giant magnetoresistive effect (GMR) element (CIP-GMR element) is widely used as a reproducing head. The spin-valve GMR element with such a structure is positioned between upper and lower shield layers formed by soft magnetic metal films and arranged to be sandwiched by insulation layers called gap layers. The recording density in a bit direction is determined by a gap between the upper and lower shield layers (length of a shield gap or a read gap).

With an increase in the recording density, needs for narrow shield gaps and/or narrow tracks have been increased for the reproducing element for the reproducing heads. However, element areas are reduced due to the narrowing of the tracks of the reproducing element and the shortening of a height of the reproducing element caused by the narrowing of the tracks. Therefore, there are problems with the conventional structure that the heat dissipation efficiency is decreased by the reduction of the areas, and that the operating current is limited from a viewpoint of reliability.

To solve such problems, a CPP-GMR element that electrically serially connects the upper and lower shield layers and the MR element and that does not require an insulation layer between the shield layers has been proposed. This technology is considered necessary for achieving a recording density that exceeds 200 Gbits/in$^2$.

The CPP-GMR element has a layered structure that includes first and second ferromagnetic layers formed to sandwich a conductive non-magnetic intermediate layer at both sides. The layered structure of a well-known spin-valve type CPP-GMR element sequentially includes, from a substrate side, a lower electrode, an antiferromagnetic layer, a first ferromagnetic layer, a conductive non-magnetic intermediate layer, a second ferromagnetic layer and an upper electrode.

A magnetization direction of the first ferromagnetic layer, which is one of the two ferromagnetic layers, is pinned to be perpendicular with a magnetization direction of the second ferromagnetic layer when there is no externally applied magnetic field. The magnetization direction of the first ferromagnetic layer is pinned by arranging the antiferromagnetic layer adjacently to the first ferromagnetic layer and by applying a unidirectional anisotropic energy to the first ferromagnetic layer due to an exchange-coupling of the antiferromagnetic layer and the first ferromagnetic layer. The unidirectional anisotropic energy may be referred to as an "exchange bias" or a "coupling magnetic field." Therefore, the first ferromagnetic layer is called a magnetization pinned layer. In contrast, the second ferromagnetic layer is called a free layer. Moreover, by forming the magnetization pinned layer (first ferromagnetic layer) in a three layer structure of a ferromagnetic layer, a non-magnetic metal layer and a ferromagnetic layer (so-called "synthetic ferromagnetic structure" or "synthetic pinned structure"), a strong exchange-coupling is applied between the two ferromagnetic layers, and an exchange-coupling force from the antiferromagnetic layer can be effectively increased. In addition, an influence of a static magnetic field generated from the magnetization pinned layer on the free layer can be reduced. Thus, the "synthetic pinned structure" is currently widely used.

However, to respond to the recent needs for a super-high recording density, further thinning of layers of the MR element is required. U.S. Pat. No. 7,019,371B2, U.S. Pat. No. 7,035,062B1 and U.S. Pat. No. 7,177,122B2, for example, propose a new GMR element structure having a simple three-layer structure, as a base structure, including a ferromagnetic layer (free layer), a non-magnetic intermediate layer, and a ferromagnetic layer (free layer).

Such a structure may be called a dual free layer (DFL) element structure in this application, for convenience. In the DFL element structure, the two ferromagnetic layers (free layers) are exchange-coupled so that their magnetization becomes antiparallel to each other. In addition, as a hard magnet is positioned at a deep position, which is opposite from an air bearing surface (ABS) that corresponds to a medium-opposing surface of the element, an initial state of the element is created, where, using effects of a bias magnetic field generated from the hard magnet, magnetization directions of two magnetic layers (free layers) are each inclined towards a track width direction by approximately 45 degrees.

When the element in this initial magnetization state detects a signal magnetic field from the medium, the magnetization directions of the two magnetic layers change like a motion of a pair of scissors cutting paper. As a result, a resistance value of the element changes.

If this DFL element structure is used in a so-called TMR element or CPP-GMR element, the "read gap length," which is a gap between the upper and lower shield layers, can be remarkably narrowed compared with a conventional generic spin-valve type CPP-GMR element. More specifically, the above-discussed antiferromagnetic layer, which is required in a generic spin-valve type CPP-GMR element, becomes unnecessary. Further, the ferromagnetic layer with the above-discussed "synthetic pinned structure" becomes unnecessary. As a result, the "read gap length," which was conventionally said to be limited to 30 nm, can be further shortened.

In the DFL element structure, the read gap length can be shortened, and the recording density in the track direction can be increased.

For the DFL element structure, some of the inventors of the present application have proposed a technique to obtain a very narrow read gap by magnetically coupling two exchange-coupling shield layers, which are made in a single domain by the antiferromagnetic layers, and two free layers in order to control the magnetic direction of the two free layers, and by operating the exchange-coupling shield layers as a shielding (e.g., US2010/0039734).

As is apparent from a schematic diagram of a conventional DFL element structure viewed from the ABS side shown in FIG. 18, non-magnetic metal filled layers 603 formed of a Cr or CrTi layer are formed at both ends of the sensor film 600 including two free layers 630 and 650 that are separated by a non-magnetic layer 640. The sensor film 600 and the non-magnetic metal filled layers 603 are separated by an insulation layer 602 made of $Al_2O_3$. As shown in FIG. 19 (FIG. 19 is a cross sectional view seen from an arrow α1-α1 in FIG. 18), on the rear side of these layers, a bias layer 800 for making magnetic directions of the two free layers 630 and 650 to perpendicularly intersect with each other is formed with an insulation layer 710 made of $Al_2O_3$ through the bias layer 800. The bias layer 800 may be formed by forming a CoPt layer, as a hard magnet layer, on a Cr base layer.

However, after exhaustive research on the configuration of the bias layer after film formation by the inventors of this application, it was found that an ideal flat bias layer 800 extending in the X direction is essentially difficult to obtain if the non-magnetic metal filled layer 603 is configured simply by a single layer of Cr or CrTi.

That is, as shown in FIG. 20 (FIG. 20 is an overall view of the bias layer 800 from the rear side viewed from the arrow α2-α2 in FIG. 19), the bias layer 800 is not flat in the X direction but includes a U-shaped formation 800a, in which a part of the hard magnet layer positioned at the DFL element part is lowered.

The reason is explained below based on the film formation process for the element configuration. To ease the explanation, the film structure is simplified.

First, as shown in FIGS. 21A and 21B (FIG. 21B is a cross sectional view seen from the arrow α3-α3 in FIG. 21A), a sensor film 600 (or MR film 600) that includes DFL (dual free layer) is formed on a shield layer 601, and a resist pattern 900 is formed on the sensor film 600. With the resist pattern 900 as a mask, the sensor film 600 is milled and patterned. As shown in FIGS. 22A and 22B (FIG. 22B is a cross sectional view seen from the arrow α4-α4 in FIG. 22A), an insulation layer 602 (e.g., $Al_2O_3$) and a non-magnetic metal layer 603 (e.g., Cr or CrTi) are filled in the milled indented parts. The resist is then lifted off from the sensor film 600, and the structure becomes as shown in FIGS. 23A and 23B (FIG. 23B is a cross sectional view seen from the arrow α5-α5 in FIG. 23A). The formation shown in FIG. 23A continues in the depth direction of the figure.

Next, as shown in FIG. 24A, FIG. 24B (FIG. 24B is a cross sectional view seen from the arrow α6-α6 in FIG. 24A) and FIG. 24C (FIG. 24C is a cross sectional view seen from the arrow α7-α7 in FIG. 24A), a resist pattern 910 is formed to form a bias layer on the rear part. With the resist pattern 910 as a mask, the rear part is milled, and a bias layer 800 is filled in the milled indented part. That is, the hard magnet layer 800 is formed on an insulation layer 710 (e.g., $Al_2O_3$) that is laid down (e.g., forming a CoPt layer 800 as a hard magnet layer on a Cr base layer). After a cap layer 810 (e.g., Cr) is disposed on the layer 800, the resist pattern 910 is lifted off.

In the production method based on the conventional multilayer structure as discussed above, when milling the rear part to lay down the above-discussed hard magnet layer 800, because the milling speed(s) is not identical for non-magnetic layer 603 and the sensor film 600, which is the DFL element part, the depths of milling differ. As a result, the hard magnet layer 800 filled in the milled section does not become flat. In other words, the hard magnet layer 800 does not become flat in the X direction as shown in FIG. 20, but rather includes a U-shaped formation 800a, in which a part of the hard magnet layer 800 corresponding to the DFL element part (sensor film 600) is lowered.

This causes a chance that the bias magnetic field from the hard magnet layer 800 is not effectively intensively applied to the DFL element.

In addition, as shown in FIG. 25, after forming the hard magnet layer 800 on the rear part, ion beam etching is performed to clean the entire upper formation surface prior to forming an upper side exchange-coupling shield layer (shield layer). The flatness is maintained if the ion beam etching rates are the same for, for example, the cap layer (NiFe) that is the top layer at the DFL element part (sensor film 600) and the non-magnetic metal layer 603. However, if the ion beam etching is faster for the non-magnetic metal layer 603, then the flatness of the non-magnetic metal layer 603 decreases (for instance, a depressed portion is formed on the non-magnetic metal layer 603). FIG. 26 illustrates the shield layer 605 that was formed after the ion beam etching.

The present invention was made in consideration of these facts. The present invention has an objection to provide a magnetoresistive effect element, in which flatness of an orthogonalizing bias function part (a hard magnet layer) positioned at the rear part of the MR element having two free layers can be maintained, and in which unnecessary magnetic flux is prevented from leaking to the upper shield, thereby improving fluctuation of a QST (quasi-static test) waveform.

SUMMARY OF THE INVENTION

In order to solve the above matters, an MR element in a current perpendicular to plane (CPP) structure of the present invention includes a magnetoresistive effect part (MR part), and a first shield layer and a second shield layer formed to sandwich the MR part from above and below, in which a sense current is applied in a lamination direction of the MR part. Wherein, the MR part has a non-magnetic intermediate layer, a first ferromagnetic layer functioning as a free layer and a second ferromagnetic layer functioning as a free layer, the first and second ferromagnetic layers being layered to sandwich the non-magnetic intermediate layer, an orthogonalizing bias function part is formed at a rear part of the MR part influencing a substantial orthogonalizing function of the first and second ferromagnetic layers in respective magnetization directions thereof, non-magnetic metal layers are formed to abut both ends of the MR part in a width direction and are separated from both ends of the MR part by respective insulation layers, each of the non-magnetic metal layers is in a two-layer structure configured with a first non-magnetic metal layer positioned at a lower side as a lower layer and a second non-metal layer positioned at an upper side as an upper layer, and a relationship $R_2 < R_1$ is met, where $R_1$ is a milling rate for the first non-magnetic metal layer that is the lower layer, and $R_2$ is another milling rate for the second non-magnetic metal layer that is the upper layer.

Also, in a preferred embodiment of the MR element of the present invention, a relationship $R_2 < R_0 \leq R_1$ is met, where $R_0$ is an average milling rate for the MR part, $R_1$ is the milling rate for the first non-magnetic metal layer that is the lower layer, and $R_2$ is the milling rate for the second non-magnetic metal layer that is the upper layer.

Also, in a preferred embodiment of the MR element of the present invention, each of the first and second shield layers further have a part in which the magnetization direction is controlled by an antiferromagnetic layer embedded in each of the first and second shield layers. The first and second ferromagnetic layers are under an antiparallel magnetization state in which the respective magnetization directions are influenced to become opposite from each other due to an effect of the parts in which the magnetization directions are controlled.

Also, in a preferred embodiment of the MR element of the present invention, a ratio t2/t1 is in a range from 0.04 to 0.36, where t1 is a film thickness of the first non-magnetic metal layer, and t2 is a film thickness of the second non-magnetic metal layer.

Also, in a preferred embodiment of the MR element of the present invention, the first non-magnetic metal layer is formed of Ru, and the second non-magnetic metal layer is formed of either Cr or Cr alloy.

Also, in a preferred embodiment of the MR element of the present invention, the second non-magnetic metal layer is formed of CrTi.

Also, in a preferred embodiment of the MR element of the present invention, a total thickness of t1 and t2 is 15-30 nm.

Also, in a preferred embodiment of the MR element of the present invention, the magnetization directions of the first and second ferromagnetic layers are antiparallel in the width direction when an influence of the orthogonalizing bias function part is removed.

A thin film magnetic head of the present invention includes a medium opposing surface that faces a recording medium; the MR element discussed above, the MR element being positioned near the medium opposing surface to detect a signal magnetic field from the recording medium; and a pair of electrodes to transmit an electric current in the lamination direction of the MR element.

A head gimbal assembly of the present invention includes a slider including the thin film magnetic head discussed above and positioned to face the recording medium; and a suspension that elastically supports the slider.

A magnetic disk device of the present invention includes a slider including the thin film magnetic head discussed above and positioned to face the recording medium; and a positioning device that supports and positions the slider with respect to the recording medium.

BRIEF DESCRIPTION OF THE DRAWINGS

FIG. 16 is an X-Z plan view seen from the medium opposing surface side for explaining the production process of the MR element.

FIG. 17 is an X-Z plan view seen from the medium opposing surface side for explaining the production process of the MR element.

DESCRIPTION OF PREFERRED EMBODIMENTS

A best mode to implement the present invention is described in detail below.

In the following description, in each figure, a length in the X-axis direction is referred to as "width," a length in the Y-axis direction is referred to as "length," and a length in the Z-axis direction is referred to as "thickness."

In addition, of the Y-axis direction, an air bearing surface (a side closer to the thin film magnetic head that faces a recording medium; may be called "ABS") may be referred to as a "front side," and the opposite side (deep side) may be referred to as a "rear side." Moreover, a direction to stack multiple layers of the element may be referred to as an "upward direction" or an "upper side," and the opposite direction may be referred to as a "downward direction" or a "lower side."

Figure 1:
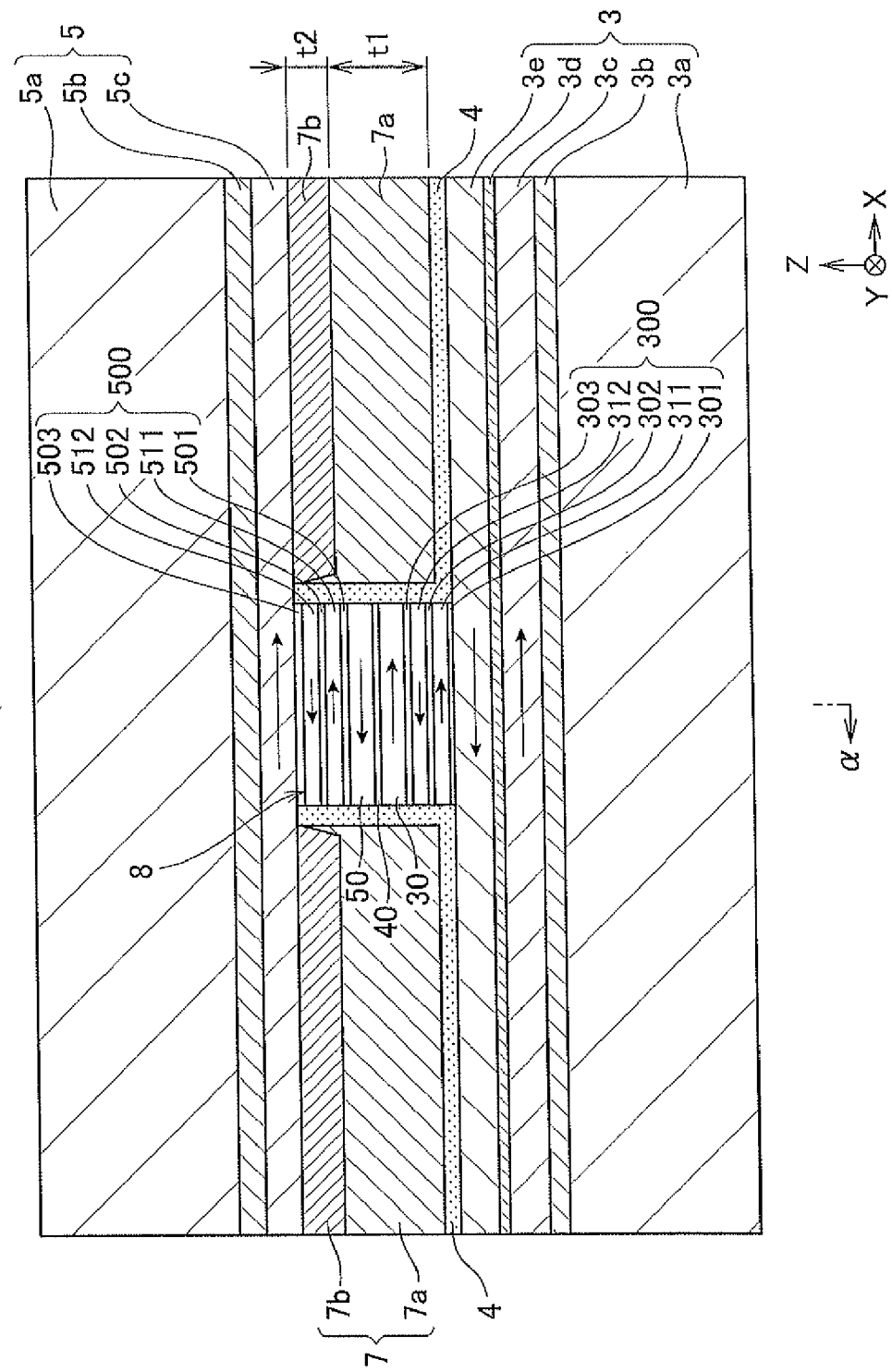
FIG. 1 is a so-called ABS end surface view that shows a magnetoresistive effect (MR) element of the present invention seen from a medium opposing surface side.
Figure 2:
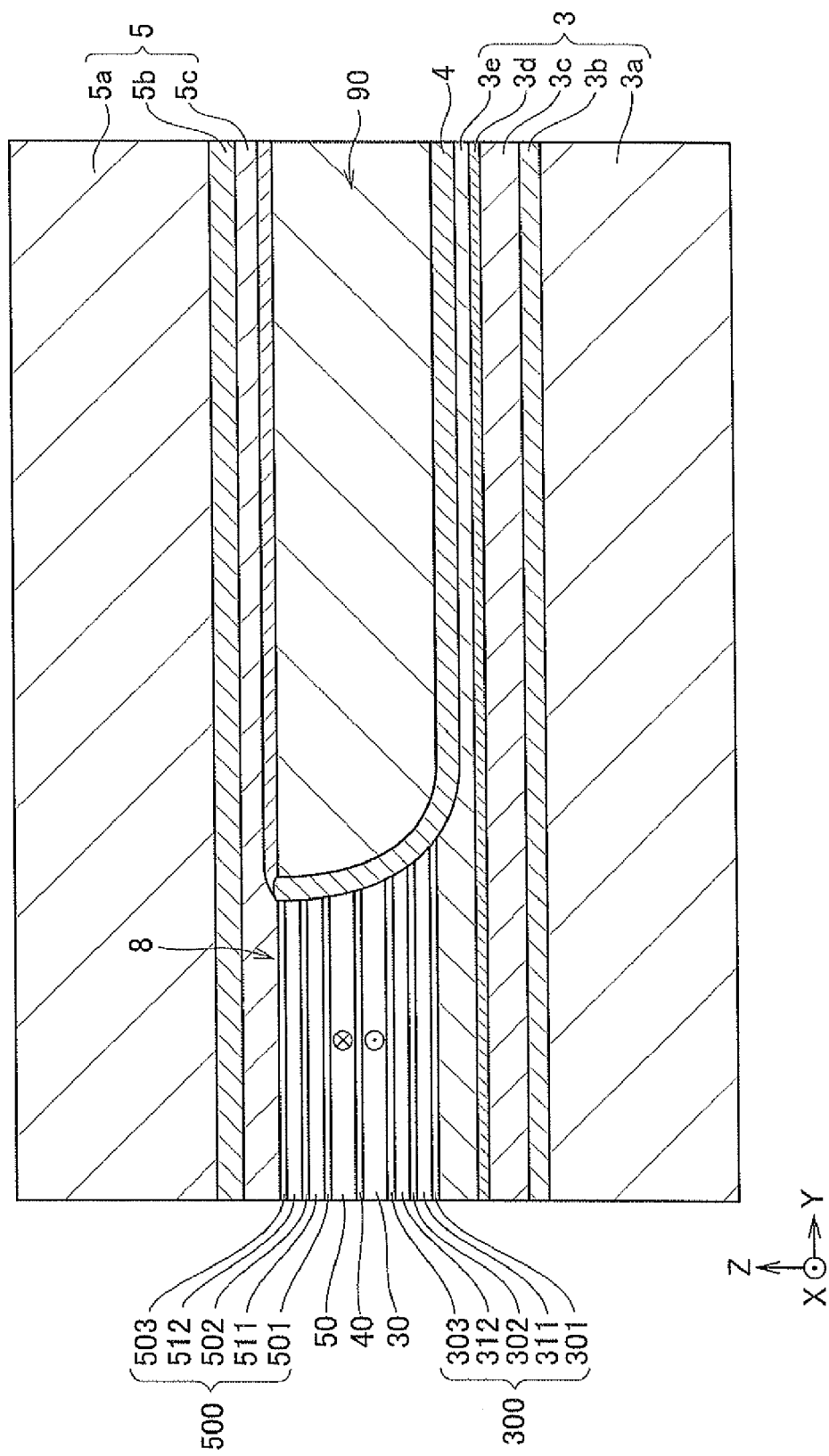
FIG. 2 is a cross sectional view of the MR element seen from the arrow α1-α1 in FIG. 1.

FIG. 1 is a so-called ABS end surface view that shows a magnetoresistive effect element (MR element) of the present invention seen from a medium opposing surface side. FIG. 2 is a cross sectional view seen from the arrow α1-α1 in FIG. 1.

The MR element of the present invention uses a DFL element structure, in which two free layers sandwich a non-magnetic intermediate layer.

That is, as shown in FIG. 1 showing an end surface on the air bearing surface, the MR element of the present invention includes a magnetoresistive effect part (MR part) 8 having a non-magnetic intermediate layer 40, and a first ferromagnetic layer 30 and a second ferromagnetic layer 50, which function as free layers and are layered so as to sandwich the non-magnetic layer 40. The MR element is a MR element in a current perpendicular to plane (CPP) structure in which a sense current is applied in a lamination direction of the MR part. In particular, a part of the two free layers of the MR part 8 can be considered as a so-called sensor region.

As shown in FIG. 2, an orthogonalizing bias function part 90 is formed on the rear part of the MR part 8. The orthogonalizing bias function part 90 has a function to substantially orthogonalize the magnetization directions of the first ferromagnetic layer 30 and the second ferromagnetic layer 50. Detailed effects of the orthogonalizing bias function part 90 are discussed later.

Moreover, in the present invention, as shown in FIG. 1, a non-magnetic metal layer 7 is positioned at each end of the MR part 8 in the width direction, with an insulation layer 4 between the MR part 8 and the non-magnetic metal layer 7. The insulation layer 4 extends from both ends of the MR part 8 in the width direction and on a first shield layer 3, while maintaining the CPP structure.

The non-magnetic metal layer 7 has a two-layer structure including a first non-magnetic metal layer 7a positioned at the lower side as a lower layer, and a second non-magnetic metal layer 7b positioned at the upper side as an upper layer.

In addition, above and below the MR part 8 and the non-magnetic metal layer 7 that is provided throughy the insulation layer 4, a lower side first shield layer 3 and an upper side second shield layer 5 are formed so as to sandwich these layers.

The first shield layer 3 and the second shield layer 5, in addition to the normal magnetic shielding functions, provide magnetic effects to the first ferromagnetic layer 30 and the second ferromagnetic layer 50, which are the two free layers, in addition to the normal magnetic shielding function, and function to form an antiparallel magnetization state where the magnetization directions of the two free layers 30 and 50 become opposite from each other.

Each structuring element is described in detail below.

<First Ferromagnetic Layer 30 and Second Ferromagnetic Layer 50>

As discussed above, the multilayer configured by the first ferromagnetic layer 30, the non-magnetic intermediate layer 40 and the second ferromagnetic layer 50 forms the sensor region part in the MR part 8. The total thickness of the multilayer is approximately 10-20 nm.

Among these layers, the first ferromagnetic layer 30 and the second ferromagnetic layer 50 function as so-called free layers, in which a magnetization direction of each layer changes by the effects of an externally applied magnetic field (signal).

Materials configuring the first ferromagnetic layer 30 and the second ferromagnetic layer 50 may be, for example, NiFe, CoFe, CoFeB, CoFeNi, $Co_2MnSi$, $Co_2MnGe$, $FeO_x$ (oxide of Fe).

These layers are not limited to being single layers but may be configured from multiple layers.

Thicknesses of the first ferromagnetic layer 30 and the second ferromagnetic layer 50 may be approximately 0.5-8 nm.

<Non-Magnetic Intermediate Layer 40>

The non-magnetic intermediate layer 40 is a film required for achieving the MR effect and may be formed from, for example, Cu, Au, Ag, Zn, Ga, TiOx, ZnO, InO, SnO, GaN, ITO (indium tin oxide), $Al_2O_3$ and MgO. The non-magnetic intermediate layer 40 may be a multilayer film having two or more layers.

A thickness of the non-magnetic intermediate layer 40 is approximately 0.5-5 nm.

<Orthogonalizing Bias Function Part 90>

The orthogonalizing bias function part 90 shown in FIG. 2 is generally configured from a permanent magnet or the like that can apply a bias magnetic field in approximately the Y-axis direction.

As shown in FIG. 2, as the orthogonalizing bias function part 90 made of a permanent magnet or the like is positioned on a deep position that is opposite from the ABS, which corresponds to the medium-opposing surface of the element, an initial state of the element is created, where, using effects of a bias magnetic field generated from the orthogonalizing bias function part 90, magnetization directions of the two magnetic layers (free layers) are orthogonalized and each is inclined towards a track width direction by approximately 45 degrees. The specification (e.g., magnetic characteristics, size and position) of the orthogonalizing bias function part 90 is defined to form such initial state.

When the element in the initial magnetization state detects a signal magnetic field from the medium, the magnetization directions of the two magnetic layers change like an operation of a pair of scissors cutting paper. As a result, a resistance value of the element changes. Such operation is discussed later.

<Non-Magnetic Metal Layer 7>

As discussed above, the non-magnetic metal layers 7 are formed and disposed to abut both ends of the MR part 8 in the width direction and are separated from the MR part 8 by the insulation layer 4 made of alumina or the like. The insulation layer 4 is also formed below the non-magnetic metal layer 7.

The non-magnetic metal layer 7 in the present invention has a two-layer structure including a first non-magnetic metal layer 7a positioned at the lower side as a lower layer and a second non-magnetic metal layer 7b positioned at the upper side as an upper layer.

Materials of the first non-magnetic metal layer 7a and the second non-magnetic metal layer 7b are selected such that a value of milling rates for the first non-magnetic metal layer 7a and the second non-magnetic metal layer 7b satisfies a relationship $R_2<R_1$, where $R_1$ is a milling rate for the first non-magnetic metal layer 7a at the lower side, and $R_2$ is a milling rate for the second non-magnetic metal layer 7b at the upper side. If the materials that satisfy the relationship $R_2<R_1$ are not selected, it would be difficult to maintain the flatness of the orthogonalizing bias function part of the hard magnet layer that is positioned at the rear part of the MR part having the two free layers. Therefore, it would likely be difficult to maintain the bias effects.

Each milling rate may be determined by measuring a difference of height using a profilometer and by obtaining a depth of milling per unit time after the following processes: forming a film subject to the rate measurement, patterning a resist mask on the formed film, forming a difference by milling, and peeling the resist mask. The amount of milling is approximately 100 nm.

Further, concerning the milling rates for the first non-magnetic metal layer 7a and the second non-magnetic metal layer 7b together with the relation to the material structuring the MR element 8, the materials of the first non-magnetic metal layer 7a and the second non-magnetic metal layer 7b are selected to satisfy a relationship $R_2<R_0 \leq R_1$, where $R_0$ is an average milling rate for the MR element 8, $R_1$ is the milling rate for the first non-magnetic metal layer 7, and $R_2$ is the milling rate for the second non-magnetic metal layer 7b.

If this condition is not satisfied, it would be difficult to maintain the flatness of the orthogonalizing bias function part of the hard magnet layer that is positioned at the rear part of the MR part with the two free layers. Therefore, it would likely be difficult to maintain the bias effects. Further, the flatness would not be maintained for the ion beam etching, which is performed for the purpose of the cleaning process (removing process of the oxidized layer) the non-magnetic metal layer 7 and the MR part 8 prior to forming the upper shield layer. As such, there is a problem that the flatness of the upper shield layer formed thereon would be decreased.

In the present invention, such problems can be resolved, and accordingly, excellent bias effects can be maintained. In addition, a chance that unnecessary magnetic fluxes leak on the upper shield layer is decreased, thereby improving the fluctuation of the QST waveform.

A multilayer structure of the particular non-magnetic metal layer 7 may preferably be:

(1) a two-layer multilayer consisting of the first non-magnetic metal layer 7a formed from Ru (lower layer) and the second non-magnetic metal layer 7b formed from Cr (upper layer); or (2) a two-layer multilayer consisting of the first non-magnetic metal layer 7a formed from Ru (lower layer) and the second non-magnetic metal layer 7b formed from Cr alloy (in particular, preferably CrTi) (upper layer).

Furthermore, with regard to the configuration of a ratio of thicknesses of the above-discussed two layers 7a and 7b forming the non-magnetic metal layer 7, a ratio t2/t1 is preferably in a range of 0.04-0.36, more preferably in a range of 0.1-0.2, yet more preferably in a range of 0.1-0.15, where t1 is a film thickness of the first non-magnetic metal layer 7a, and t2 is a film thickness of the second non-magnetic metal layer 7b. If the value of the ratio t2/t1 becomes less than 0.04 or exceeds 0.36, it would also be difficult to maintain the flatness of the orthogonalizing bias function part of the hard magnet layer that is positioned and formed at the rear part of the MR part having the two free layers. Therefore, it would likely be difficult to maintain the bias effects.

A total thickness of t1 and t2 is approximately 15-30 nm.

An example of a more particular non-magnetic metal layer 7 may preferably be:

(1) a two-layer multilayer consisting of the first non-magnetic metal layer 7a having a thickness of 14-25 nm and formed from Ru (lower layer) and the second non-magnetic metal layer 7b having a thickness of 1-5 nm and formed from Cr (upper layer); or (2) a two-layer multilayer consisting of the first non-magnetic metal layer 7a having a thickness of 14-25 nm and formed from Ru (lower layer) and the second non-magnetic metal layer 7b having a thickness of 1-5 nm and formed from Cr alloy (in particular, preferably CrTi) (upper layer).

In these structures, during the milling process for positioning the orthogonalizing bias function part of the hard magnet layer at the rear part of the MR element, the Ru film can be milled by a depth of the DFL element part after passing the thin Cr (or CrTi) film. On the other hand, because Cr (or CrTi) on the upper surface is a low rate material, with the ion beam etching for the cleaning purpose prior to forming the shield layer thereon, the non-magnetic metal layer 7 is prevented from being milled too much, and thus, the flatness of the upper shield layer formed thereon is not degraded. In other words, the flatness of the orthogonalizing bias function part formed at the rear side of the element and the flatness of the upper side shield layer formed after the ion beam etching for the cleaning purpose are secured.

Sufficient effects may not be obtained with a structure other than the above-discussed combination. That is, if Ta, for example is used as the material for the non-magnetic metal layer 7, a bump is created due to oxidation when polishing the ABS, which is the medium-opposing surface of the MR element, and the ABS tends to be raised. Therefore, the use of Ta is not preferable. In addition, because Au and Cu, for example, are soft materials as a material for the non-magnetic metal layer 7, exposure of such materials to the ABS as a thick film would generate deformations and burrs, which are not preferable.

<First Shield Layer 3 and Second Shield Layer 5>

As discussed above, the first shield layer 3 and the second shield layer 5 are configured to provide magnetic effects to the first ferromagnetic layer 30 and the second ferromagnetic layer 50, which are two free layers, in addition to the normal magnetic shielding function, and to function to form an antiparallel magnetization state where the magnetization directions of the two free layers 30 and 50 become opposite from each other.

In other words, as shown in FIG. 1, in a state before the orthogonalizing bias function part 90 starts functioning (in a state where the orthogonalizing bias is not applied), the magnetization directions of the two free layers 30 and 50 are in the antiparallel magnetization state along the track width direction.

(Description of First Shield Layer 3)

The first shield layer 3 shown in FIG. 1 is configured by sequentially laminating a first shield body 3a, a first antiferromagnetic layer 3b, a first lower exchange coupling magnetic field application layer 3c, an exchange coupling adjustment layer 3d of for example Ru, and a first upper exchange coupling magnetic field application layer 3e.

In the case of the embodiment shown in FIG. 1, the magnetization direction of the first lower exchange coupling magnetic field application layer 3e (magnetization direction: an arrow in a rightward direction of the figure), which is pinned by the first antiferromagnetic layer 3b, is antiferromagnetically coupled with the first upper exchange coupling magnetic field application layer 3e across the change coupling adjustment layer 3d, of for example Ru (magnetization direction: an arrow in a leftward direction of the figure).

The above-discussed structure is a preferred example and is not limited to such structure.

(Description of Second Shield Layer 5)

Figure 5:
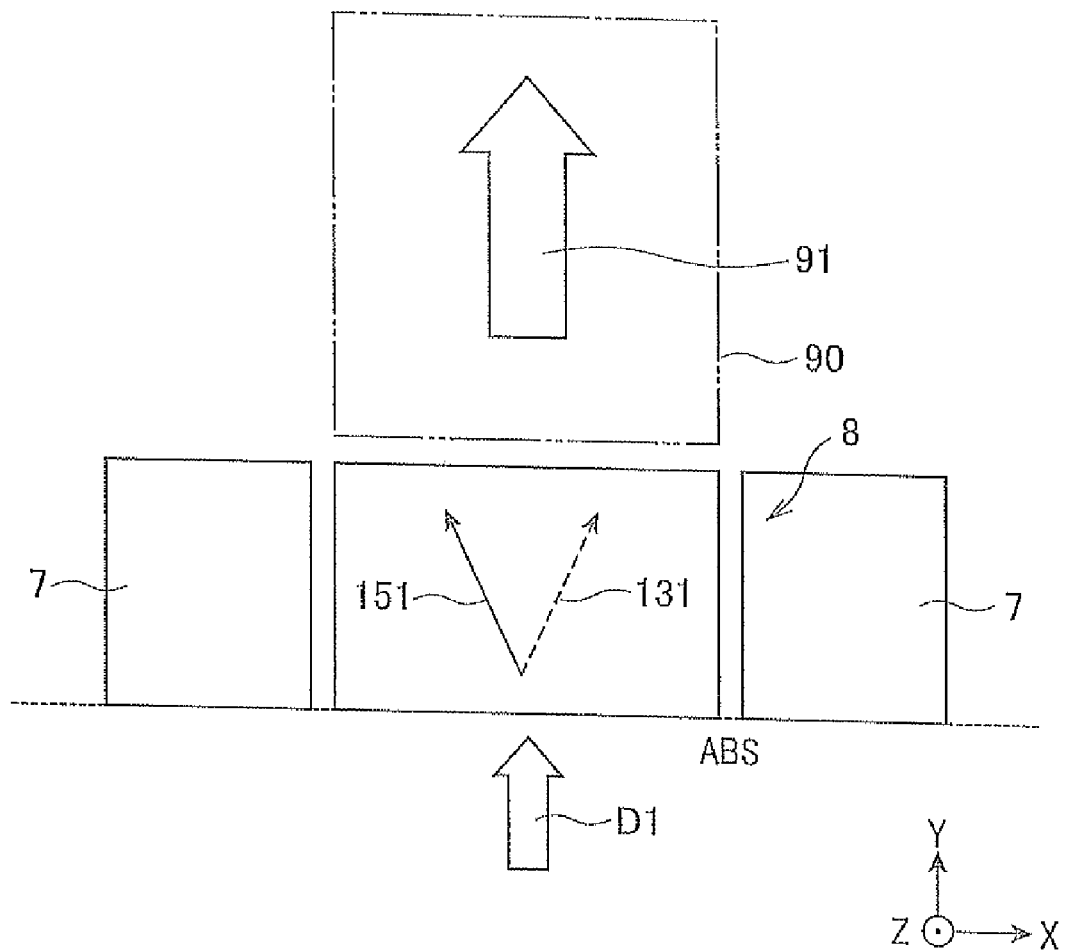
FIG. 5 is a plan view of the main parts of the present invention shown in FIG. 1 seen from the above in the X-Y plane, and is a model diagram illustrating a change in magnetization state in accordance with an external magnetic field, by which a change in magnetoresistive effects by the MR element of the present invention is obtained.
Figure 6:
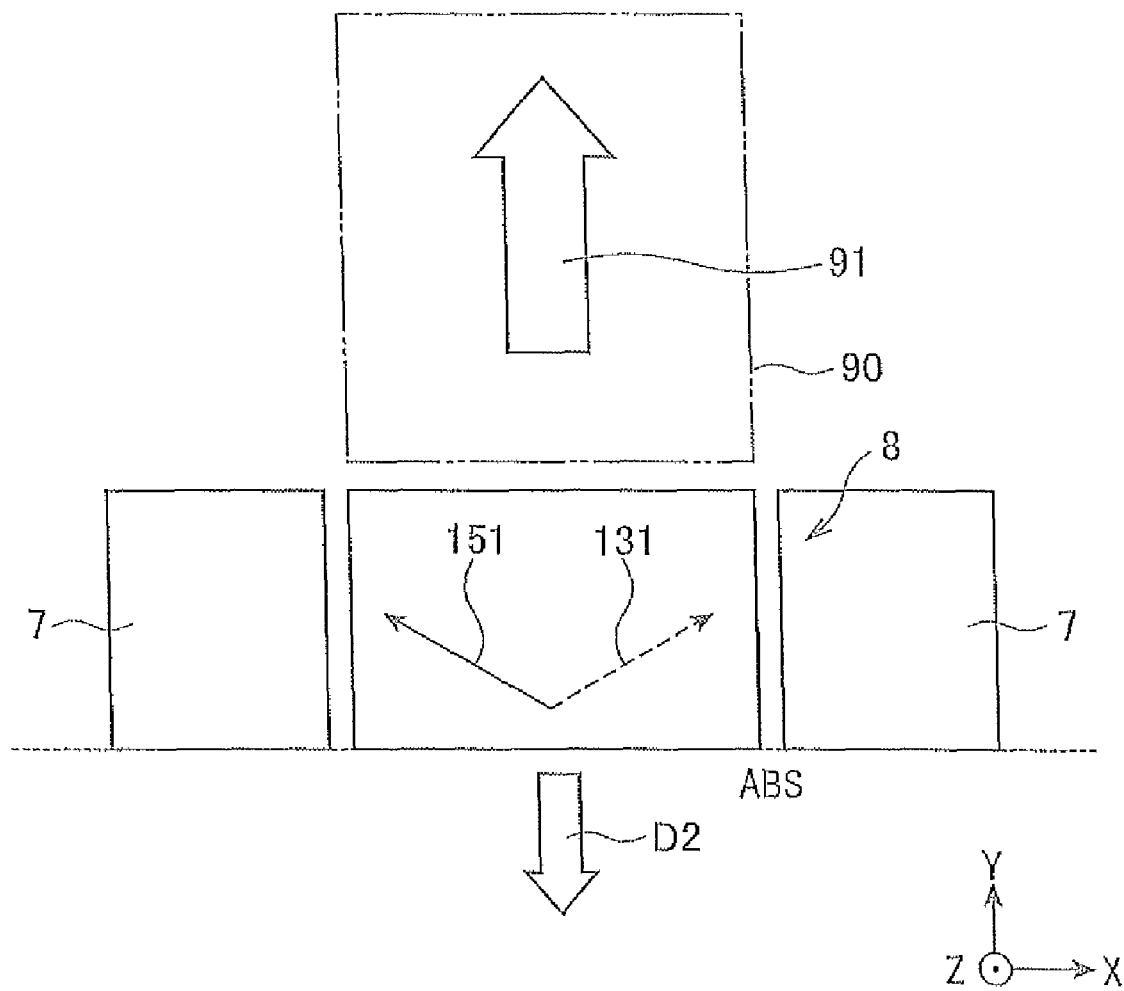
FIG. 6 is a plan view of the main parts of the present invention shown in FIG. 1 seen from the above in the X-Y plane, and is a model diagram illustrating a change in magnetization state in accordance with an external magnetic field, by which a change in magnetoresistive effects by the MR element of the present invention is obtained.

The preferred second shield layer 5 shown in FIG. 5 is configured by a second shield body 5a, a second antiferromagnetic layer 5b and a second exchange coupling magnetic field application layer 5c.

In the case of embodiment shown in FIG. 1, the magnetization direction of the second exchange coupling magnetic field application layer 5c is pinned by the second antiferromagnetic layer 5b in the "right" direction shown in the drawing.

The above-discussed structure is a preferred example and is not limited to such structure. (Structure from First Shield Layer 3 to First Ferromagnetic Layer 30 (Free Layer) and Structure from Second Shield Layer 5 to Second Ferromagnetic Layer 50 (Free Layer))

As discussed above, the first ferromagnetic layer 30 and the second ferromagnetic layer 50 are provided with effects to form antiparallel magnetization states, in which the respective magnetization directions are opposite from each other, caused by the effects of magnetic operations of the first shield layer 3 and the second shield layer 5, respectively. The reasons for the statement "provided with effects to form antiparallel magnetization states" is to consider the substantial orthogonalization of the magnetization directions of the first ferromagnetic layer 30 and the second ferromagnetic layer 50 as a result of application of a bias magnetic field from the orthogonalizing bias function part 90 as discussed above.

To achieve the above-discussed antiparallel magnetic states, a first exchange coupling transmitting layer 300 is provided between the first shield layer 3 and the first ferromagnetic layer 30 as a part of MR part 8, and a second exchange coupling transmitting layer 500 is provided between the second shield layer 5 and the second ferromagnetic layer 50 as a part of the MR part 8.

That is, the first ferromagnetic layer 30 is indirectly magnetically coupled with the first shield layer 3 (in particular, first upper exchange coupling magnetic field application layer 3e), which magnetization direction is controlled, across the first exchange coupling transmitting layer 300. In addition, the second ferromagnetic layer 50 is indirectly magnetically coupled with the second shield layer 5 (in particular, second exchange coupling magnetic field application layer 5c), which magnetization direction is controlled, across the second exchange coupling transmitting layer 500.

(Description of Detailed Structure of First Exchange Coupling Function Gap Layer 300)

An example of a detailed structure of the first exchange coupling function gap layer 300 is explained with reference to the embodiment shown in FIG. 1. However, the configuration is not limited to that described below.

The first exchange coupling transmitting layer 300 is configured by, for example from the side of the first shield layer 3, an exchange coupling adjusting layer 301 of for example Ru, a ferromagnetic layer 311 of for example CoFe, an exchange coupling adjusting layer 302 of for example Ru, a ferromagnetic layer 312 of for example CoFe, and an exchange coupling adjusting layer 303 of for example Ru.

(Description of Detailed Structure of Second Exchange Coupling Function Gap Layer 500)

An example of a detailed structure of the second exchange coupling function gap layer 500 is explained with reference to the embodiment shown in FIG. 1. However, the configuration is not limited to that described below.

The second exchange coupling transmitting layer 500 is configured by, for example from the side of the second shield layer 5, an exchange coupling adjusting layer 503 of for example Ru, a ferromagnetic layer 512 of for example CoFe, an exchange coupling adjusting layer 502 of for example Ru, a ferromagnetic layer 511 of for example CoFe, and an exchange coupling adjusting layer 501 of for example Ru. In the embodiment shown in FIG. 1, the magnetization of the second exchange coupling magnetic field application layer 5c in the second shield layer 5 (an arrow in the rightward direction of the drawing) is antiferromagnetically exchange-coupled with the ferromagnetic layer 512 via the exchange coupling adjusting layer 503. The magnetization of the ferromagnetic layer 512 (an arrow in the leftward direction of the drawing) is antiferromagnetically exchange-coupled with the ferromagnetic layer 511 via the exchange coupling adjusting layer 502. The magnetization of the ferromagnetic layer 502 (an arrow in the rightward direction of the drawing) is antiferromagnetically exchange-coupled with the ferromagnetic layer 50 via the exchange coupling adjusting layer 501.

Regarding the exchange coupling adjusting layer, an exchange coupling intensity for the exchange coupling adjusting layer formed by Ru, for example, is known to indicate "positive" or "negative" values depending on its film thickness, and a particularly large negative exchange-coupling intensity is obtained around 0.8 nm, for example. The "negative" exchange-coupling intensity means that the magnetization directions of the magnetic layers located on each side of the Ru layer become antiparallel with each other.

The first exchange coupling transmitting layer 300 and the second exchange coupling layer 500 may be configured from a single exchange coupling adjusting layer of for example Ru, to narrow a so-called gap space.

In addition, as shown in FIG. 1, the magnetization direction of the first lower exchange coupling magnetic field application layer 3c (an arrow in leftward direction of the drawing), which is laminated to contact the first antiferromagnetic layer 3b, and the magnetization direction of the second exchange coupling magnetic field application layer 5c (an arrow in leftward direction of the drawing), which is laminated to contact the second antiferromagnetic layer 5b, are in the same magnetization direction to utilize a benefit from the production that the magnetization direction of both of the application layers 3c and 5c can be pinned at the same time by a magnetic annealing process.

<Explanation of Operation for Detecting External Magnetic Fields by MR Element>

Next, operations for detecting external magnetic fields by a so-called DFL type MR element are explained with reference to an X-Y plan view showing main parts extracted from FIGS. 3-6.

Figure 3:
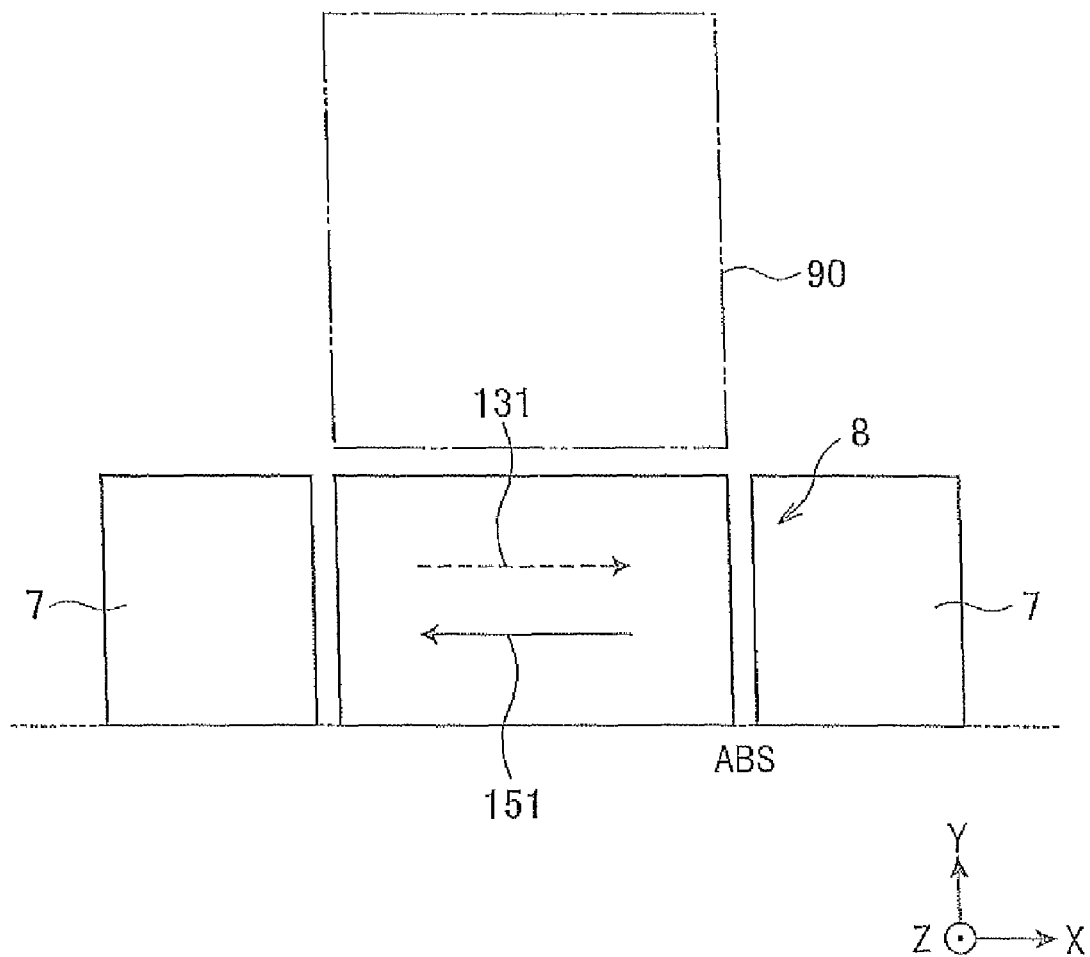
FIG. 3 is a plan view of the main parts of the present invention shown in FIG. 1 seen from the above in the X-Y plane, and is a model diagram illustrating a change in magnetization state, by which a change in magnetoresistive effects by the MR element of the present invention is obtained.

As shown in FIG. 3, in the MR element, the magnetization direction 131 of the first ferromagnetic layer 30 (free layer 30) and the magnetization direction 151 of the second ferromagnetic layer 50 (free layer 50) are opposite from each other and are in an antiparallel state along a track width direction (X-axis direction of the drawing), in a state before the orthogonalizing bias function part 90 starts functioning (e.g., a state prior to a magnetization operation of the orthogonalizing bias function part 90 in the Y direction).

A preferred example for forming the antiparallel magnetization state in which the magnetization directions 131 and 151 are opposite from each other is as discussed above.

Figure 4:
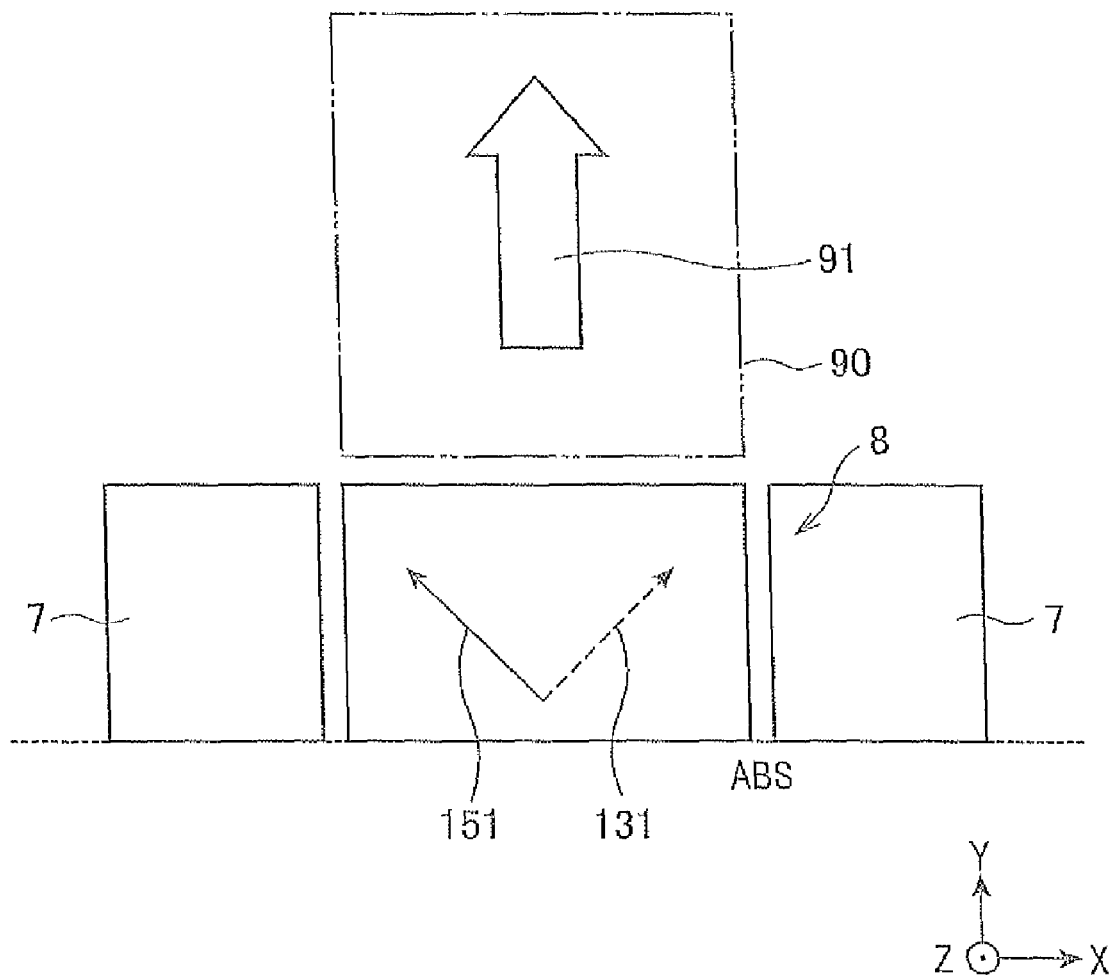
FIG. 4 is a plan view of the main parts of the present invention shown in FIG. 1 seen from the above in the X-Y plane, and is a model diagram illustrating a change in magnetization state in accordance with an external magnetic field, by which a change in magnetoresistive effects by the MR element of the present invention is obtained.

As shown in FIG. 4, the orthogonalizing bias function part 90 positioned at the rear part of the first ferromagnetic layer 30 and the second ferromagnetic layer 50 (deep side: Y direction) is magnetized in the Y direction to the deep side from the ABS, which is the medium opposing surface. This is called "ABS in magnetization." The magnetization direction 91 extends to the deep side and is perpendicular to the ABS. By this magnetization, the magnetization directions 131 and 151, which have formed in the antiparallel state, now create the initial state, in which the magnetization directions each incline by approximately 45 degrees. Therefore, the magnetization directions 131 and 151 form a substantially orthogonal relationship.

The substantially orthogonal relationship means a range of 90°±20°. Ideally, 90° is preferable.

When the ferromagnetic layers 30 and 50 in the initial magnetization state detect a signal magnetic field from the medium, the magnetization directions change like a motion of scissors cutting paper. As a result, a resistance value of the element changes. That is, as shown in FIG. 5, when an external magnetic field D1 in the direction from the ABS to the element side, the magnetization 131 for the first ferromagnetic layer 30 and the magnetization 151 for the second ferromagnetic layer 50 tend to be directed to the same direction, and the resistance of the element is reduced.

On the other hand, when an external magnetic field D2 in the direction leaving the ABS is detected, the magnetization 131 for the first ferromagnetic layer 30 and the magnetization 151 for the second ferromagnetic layer 50 tend to be directed to the opposite directions, and the resistance of the element increases.

The external magnetic fields can be detected by measuring the changes in the resistance relating to the external magnetic fields.

Appropriate orthogonalization of the magnetization directions 131 and 151 in the initial state shown in FIG. 4 can be achieved by adjusting the magnetization intensity of the orthogonalizing bias function part 90 or adjusting a degree of easy of movement for the magnetization directions of the ferromagnetic layers 30 and 50, which function as free layers.

Moreover, the magnetization direction of the orthogonalizing bias function part 90 may be "ABS out magnetization," in which the magnetization direction is rotated by 180°, instead of the above-discussed "ABS in magnetization." In other words, the orthogonalizing bias function part 90 may be magnetized in the Y direction directed to the ABS that is the medium opposing surface, from the deep side.

This type of MR element is generally used as a magnetic information reading sensor for a thin film magnetic head during a wafer process. The whole structure of the thin film magnetic head that includes the MR element is described briefly below.

[Description of Whole Structure of Thin Film Magnetic Head]

Figure 7:
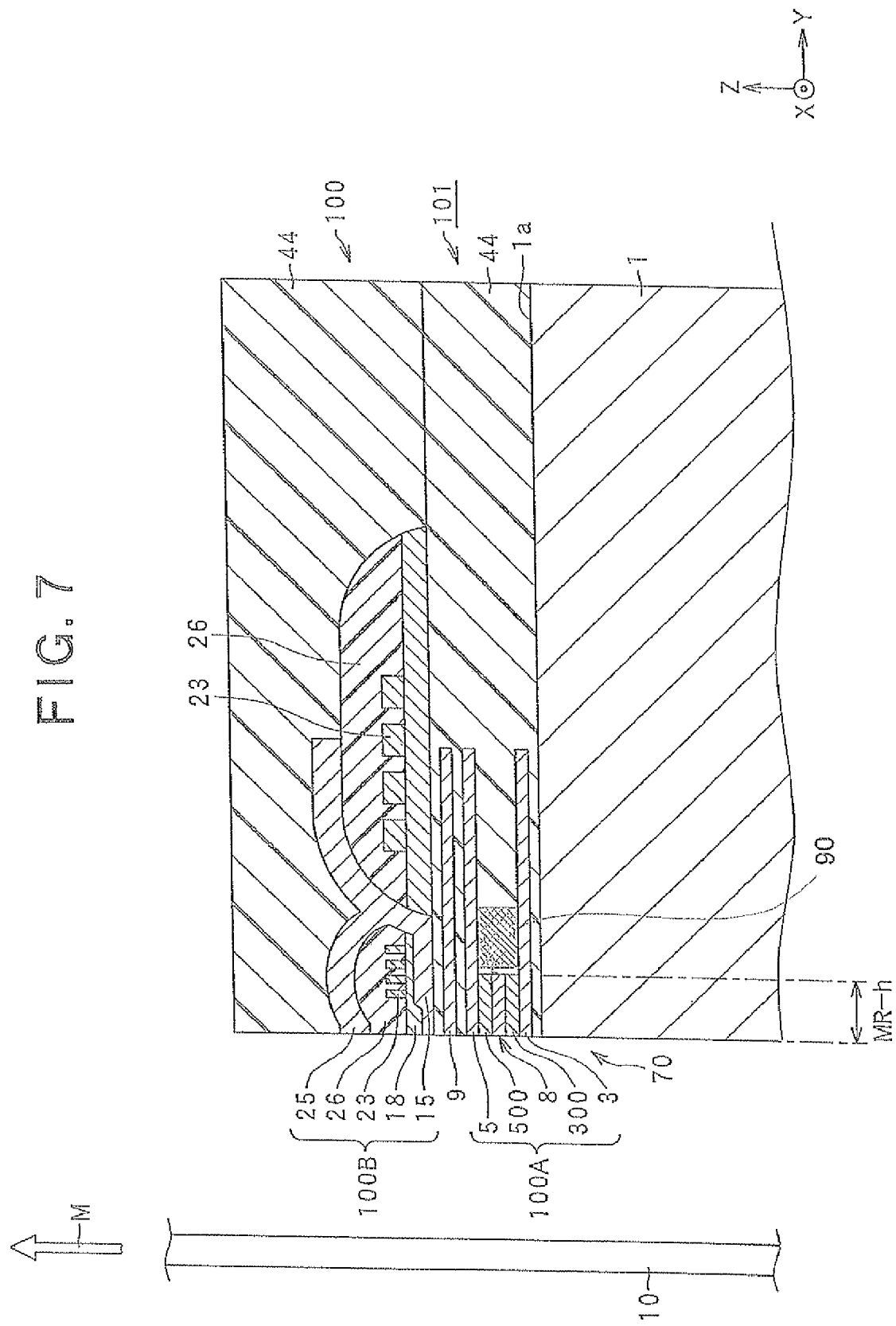
FIG. 7 is a cross sectional view of a thin film magnetic head parallel with a so-called air bearing surface (ABS).

FIG. 7 is a cross sectional view (cross section of a Y-Z plane) of a thin film magnetic head parallel with a so-called air bearing surface (ABS).

The thin film magnetic head 100 shown in FIG. 7 is used in a magnetic recording device, such as a hard disk drive, for magnetically processing a recording medium 10 thereof.

The thin film magnetic head 100 shown in the drawing is a multifunction head that can perform, as magnetic processes, both a recording process and a reproduction process. The structure has a configuration that a magnetic head part 101 is formed on a slider substrate 1 formed by a ceramic material, such as ALTIC ($Al_2O_3.TiC$), as shown in FIG. 7.

The magnetic head part 101 has a configuration, in which a reproduction head part 100A for performing a reproduction process for recorded magnetic information by using a magnetoresistive (MR) effect, and a shield type recording head part 100B that performs a recording process of a perpendicular recording method, for example, are laminated.

The following provides detailed descriptions.

The first shield layer 3 and the second shield layer 5 are flat layers formed to be approximately parallel with a side surface 1a of the slider substrate 1. These layers 3 and 5 form a part of the ABS, which is a medium opposing surface 70.

The MR part 8 is positioned so as to be sandwiched by the first shield layer 3 and the second shield layer 5 and forms a part of the medium opposing surface 70. A height of the MR part 8 in a direction perpendicular to the medium opposing surface 70 (Y direction) becomes an MR height (MR-h).

The first shield layer 3 and the second shield layer 5 are formed by pattern plating including a frame plating method or the like. Although not illustrated in the drawing, the first shield layer 3 and the second shield layer 5 need to be configured to generate the above-discussed effects of the present invention.

The MR part 8 is a multilayer film formed to be approximately parallel with the side surface 1a of the slider substrate 1 and forms a part of the medium opposing surface 70.

The MR part 8 is a current perpendicular to plane (CPP) multilayer film, in which a sense current flows in a direction perpendicular to the multilayer surface, and has the above-discussed structure.

As shown in FIG. 7, an interelement shield layer 9 made of the same material as the second shield layer 5 is formed between the second shield layer 5 and the recording head part 100B.

The interelement shield layer 9 has a function to block the MR part 8 that functions as a sensor from a magnetic field generated from the recording head part 100B and to prevent external noise at the time of reading. In addition, a bucking coil part may be formed between the interelement shield layer 9 and the recording head part 100B. The bucking coil part generates a magnetic flux that cancels out magnetic flux loops that are generated from the recording head part 100B and transmitted through the upper and lower electrode layers of the MR part 8. The bucking coil part operates to suppress unnecessary writing to the magnetic disk and a wide area adjacent tracks erasing phenomenon (WATE), which is an erasing function.

The orthogonalizing bias function part 90 is positioned at a position opposite from the medium opposing surface 70 of the MR part 8. Reference 44 is an insulation layer formed from alumina or the like.

The recording head part 100B is preferably configured for perpendicular magnetic recording, and has a main magnetic pole layer 15, a gap layer 18, a coil insulation layer 26, a coil layer 23 and an auxiliary magnetic pole layer 25, as shown in FIG. 7.

The main magnetic pole layer 15 is configured as a conductive magnetic circuit for guiding a magnetic flux induced by the coil layer 23 while converging to a recording layer of the magnetic recording medium 10 to which the writing is performed. It is preferable that a width in the track width direction (direction along the X axis in FIG. 7) and a thickness in the lamination direction (direction along the X axis in FIG. 7) at the medium opposing surface 70 side end of the main magnetic pole layer 15 are smaller than other parts. As a result, a fine and strong magnetic field for writing for the high recording density can be generated.

The media opposing surface 70-side end of the auxiliary magnetic pole layer 25 that is magnetically coupled to the main magnetic pole layer 15 forms a trailing shield part having a wider layer cross-section than other parts of the auxiliary magnetic pole layer 25. As shown in FIG. 7, the auxiliary magnetic pole layer 25 is positioned to oppose the medium opposing surface 70 end of the main magnetic pole layer 15 across the gap layer 18 formed by an insulation material such as alumina, and coil insulation layer 26.

By providing such auxiliary magnetic pole layer 25, a magnetic field gradient can become steep between the auxiliary magnetic pole layer 25 and the main magnetic pole layer 15 near the medium opposing surface 70. As a result, a signal output jitter becomes small, and a reading error rate can be reduced.

The auxiliary magnetic pole layer 25 is formed with a thickness of approximately 0.5-5 μm by a frame plating method, a spattering method or the like. The materials to be used may be configured from an alloy composed of two or three of Ni, Fe and Co, or an alloy to which a predetermined element is added to these main components.

The gap layer 18 is formed to separate the coil layers 23 and the main magnetic pole layer 15. The gap layer 18 may be configured from $Al_2O_3$, diamond-like carbon (DLC), or the like with a thickness of 0.01-0.5 μm formed by a spattering method, a chemical vapor deposition (CVD) method or the like.

[Description of Gimbal Assembly and Hard Disk Device]

Next, an example of a head gimbal assembly and a hard disk device in which the above-described thin film magnetic head is installed is described.

Figure 8:
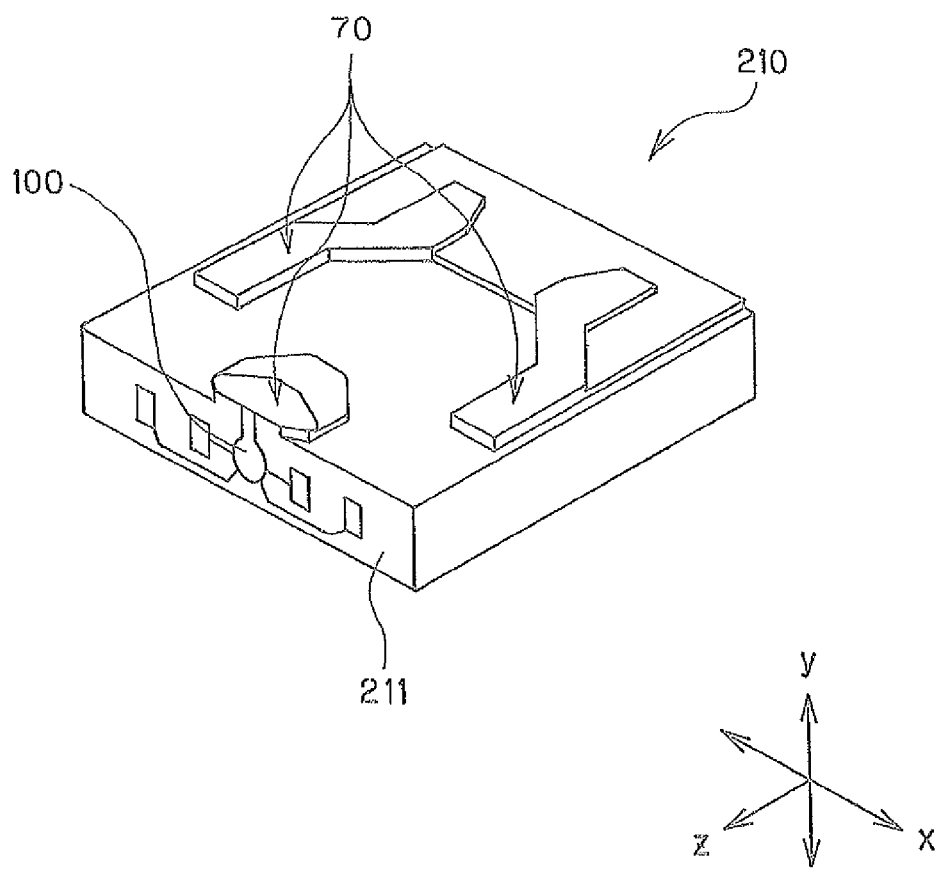
FIG. 8 is a perspective view showing a slider included in a head gimbal assembly according to an embodiment of the present invention.

First, with reference to FIG. 8, a slider 210 included in the head gimbal assembly is described. In a hard disk device, the slider 210 is positioned to face a hard disk, which is a rotated disc-shaped recording medium. The slider 210 mainly includes a substrate and a base 211 configured from an overcoat.

The base 211 has a hexahedronal shape. One of the six sides of the base 211 faces the hard disk. The medium opposing surface 70 is formed on this side.

As the hard disk rotates in the z direction in FIG. 8, a lift force is generated for the slider in the downward direction in the y direction shown in FIG. 8 due to an air flow passing between the hard disk and the slider 210. The slider flies on the surface of the hard disk due to the lift force. The x direction in FIG. 8 is a track crossing direction of the hard disk.

A thin film magnetic head according to this embodiment is formed near an air outflow-side end (left lower end in FIG. 8) of the slider.

Next, a head gimbal assembly 220 according to the embodiment is described with reference to FIG. 9. The head gimbal assembly 220 includes a slider 210 and a suspension that elastically supports the slider 210. The suspension 221 includes a plain spring rod beam 222 formed by a stainless steel, for example, a flexure 223 that is provided at one end of the rod beam 222 and connected to the slider 210 and that provides proper degree of freedom to the slider 210, and a base plate 224 provided at the other end of the rod beam 222.

The base plate 224 allows the slider 210 to be mounted to an arm 252 of an actuator for moving the slider 210 in the track crossing direction x of the hard disk 262. The actuator has the arm 252 and a voice coil motor that drives the arm 252. A gimbal part for maintaining the position of the slider 210 constant is provided at a part of the flexure 223, to which the slider is mounted.

The head gimbal assembly 220 is mounted at the arm 252 of the actuator. An assembly, in which the head gimbal assembly 220 is mounted to a single arm 252, is called a head arm assembly. An assembly, in which the head gimbal assembly 220 is mounted to each arm of a carriage having multiple arms, is called a head stack assembly.

Figure 9:
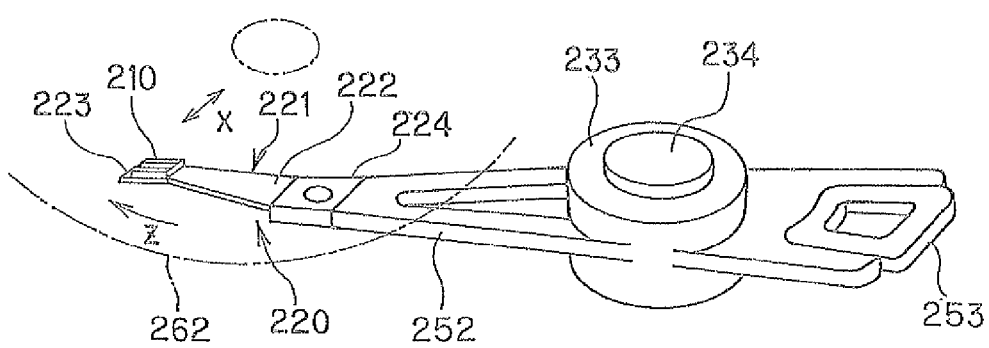
FIG. 9 is a perspective view showing a head arm assembly included in a head gimbal assembly according to an embodiment of the present invention.

FIG. 9 shows an example of a head arm assembly. In the head arm assembly, the head gimbal assembly 220 is mounted to one end of the arm 252. To the other end of the arm 252, a coil 253, which is a part of the voice coil motor, is mounted. In the middle part of the arm 252, a bearing 233 that is mounted to a shaft 234 for rotatably supporting the arm 252 is provided.

Next, an example of a head stack assembly and a hard disk device according to the embodiment are described with reference to FIGS. 10 and 11.

Figure 10:
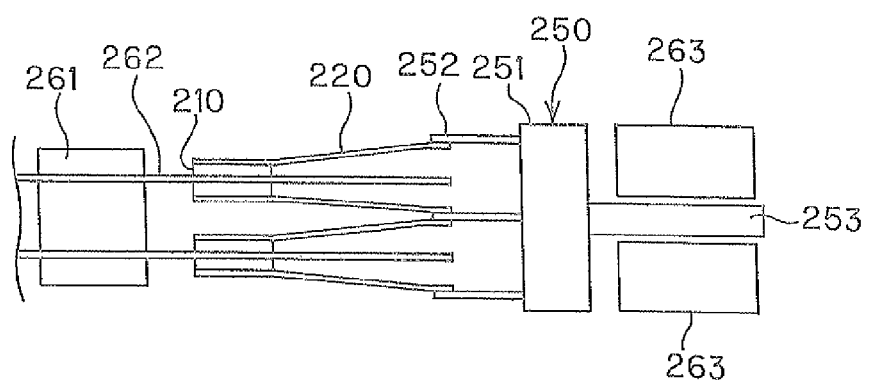
FIG. 10 is a descriptive diagram showing the main parts of the magnetic disk device according to an embodiment of the present invention.
Figure 11:
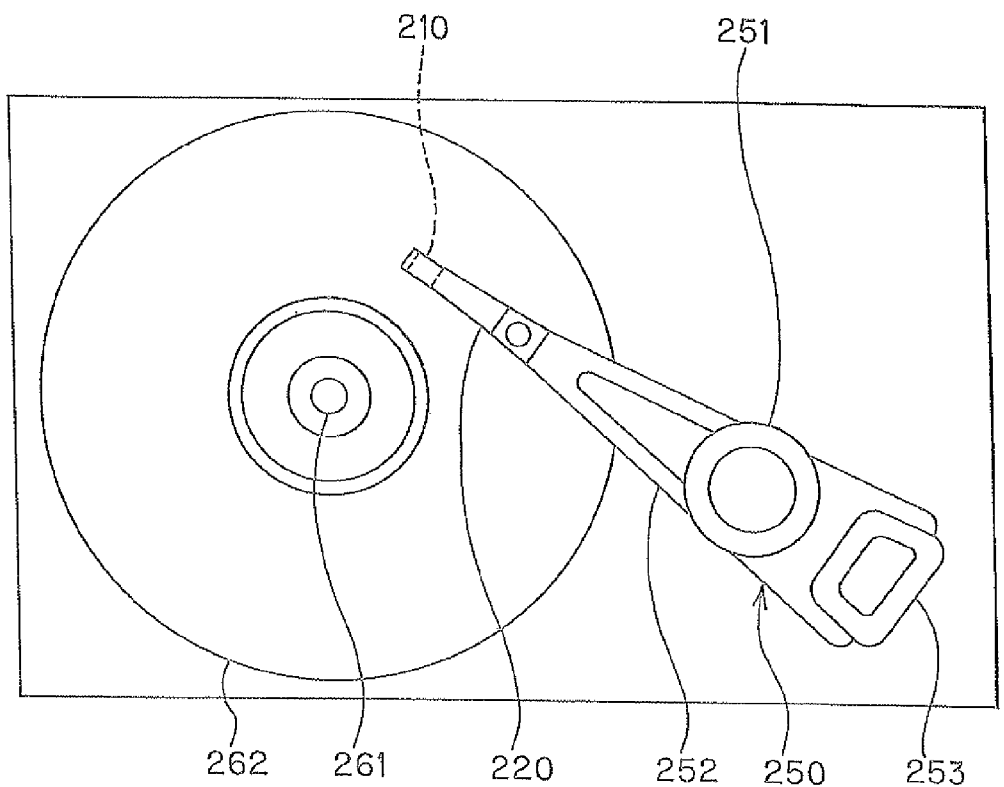
FIG. 11 is a plan view of the magnetic disk device according to an embodiment of the present invention.

FIG. 10 is a figure explaining a main part of the hard disk device, and FIG. 11 is a plan view of the hard disk device.

A head stack assembly 250 includes a plurality of arms 252 and a carriage 251. A plurality of head gimbal assemblies 220 are mounted respectively to the plurality of arms 252 such that the head gimbal assemblies 220 in the vertical direction have gaps between each other. To the other side of the carriage 251 from the arm 252, the coil 253 that is a part of the voice coil motor is mounted. The head stack assembly 250 is installed in the hard disk device.

The hard disk device has multiple hard disks 262 mounted to a spindle motor 261. At each hard disk 262, two sliders 210 are positioned facing each other and sandwiching the hard disk 262. The voice coil motor has permanent magnets 263 positioned facing each other and sandwiching the coil 253 of the head stack assembly 250.

The head stack assembly 250 and the actuator, excluding the slider 210, correspond to a positioning device in the present invention. The head stack assembly 250 and the actuator support and position the slider 210 with respect to the hard disk 262.

In the hard disk device according to the embodiment, the slider 210 is positioned with respect to the hard disk 262 by moving the slider 210 in the track crossing direction of the hard disk 262 using the actuator. The thin film magnetic head included in the slider 210 records information in the hard disk 262 by a recording head and reproduces the information recorded in the hard disk 262 by a reproducing head.

The head gimbal assembly and the hard disk device according to this embodiment provide the same effect as that with the thin film magnetic head according to the above-described embodiment.

Moreover, in the embodiment, a thin film magnetic head with a structure, in which a reproducing head part is formed on the base substrate side and the perpendicular recording head part is laminated thereon, was discussed. However, the order of the lamination may be reversed. Further, if the thin film magnetic head is used exclusively for reproducing information, only a reproducing head part may be provided.

SPECIFIC EXAMPLES

The present invention is discussed below in more detail with specific examples of the MR element of the present invention.

Embodiment 1

Producing Sample of Embodiment 1

A magnetoresistive effect film (MR film) that has a multilayer structure as shown in below Table 1 and functions as so-called DFL element was formed.

In the multilayer structure shown in below Table 1, a read gap space for the sensor main part is 14.6 nm, which is the sum of thicknesses of the exchange coupling adjusting layer (303), the first ferromagnetic layer (30), the non-magnetic intermediate layer (40), the second ferromagnetic layer (50) and the exchange coupling adjusting layer (501).

The MR film was annealed at 250° C. for three hours under a magnetic field of 1 T (tesla) after the film formation.

TABLE 1

| Multilayer Structure | Material of layer | Thickness (nm) |
|---|---|---|
| Second shield body (5a) | NiFe | 1000 |
| Second ferromagnetic layer (5b) | IrMn | 7.0 |
| Second exchange coupling magnetic field application layer(5c) | CoFe | 2.0 |
| | NiFe | 3.0 |
| Cap layer | NiFe | 8.0 |
| | CoFe | 1.0 |
| Exchange coupling adjusting layer(501) | Ru | 0.8 |
| Second ferromagnetic layer (50) (Free layer) | NiFe | 3.0 |
| | CoFeB | 1.0 |
| | CoFe | 1.0 |
| Non-magnetic intermediate layer(40) | MgO | 3.0 |
| First ferromagnetic layer (30) (Free layer) | CoFe | 1.0 |
| | CoFeB | 1.0 |
| | NiFe | 3.0 |
| Exchange coupling adjusting layer (303) | Ru | 0.8 |
| First upper exchange coupling magnetic field application layer(3e) | CoFe | 1.0 |
| | NiFe | 8.0 |
| | CoFe | 1.0 |
| Exchange coupling adjusting layer (3d) | Ru | 0.8 |
| First lower exchange coupling magnetic field application layer (3c) | CoFe | 1.0 |
| | NiFe | 8.0 |
| | CoFe | 1.0 |
| Ferromagnetic layer (3b) | IrMn | 7.0 |
| Buffer layer | Ru | 2.0 |
| | Ta | 1.0 |
| First shield body (3a) | NiFe | 1000 |

The cap layer in Table 1 is a magnetic layer that also functions as a part of the second exchange coupling magnetic field application layer (5c).

In addition, the buffer layer in Table 1 is provided mainly to control a film quality of the antiferromagnetic layer $3b$ formed thereon.

As the non-magnetic metal layer 7 (see FIG. 1), a multilayer film with the specification shown below was formed on both sides of the element in the width direction (X direction) with the insulation layer made of alumina (thickness: 5 nm) therebetween. That is, an Ru layer with a thickness of 20 nm was formed as a first non-magnetic metal layer $7a$ positioned at the lower side as a lower layer, and a CrTi layer with a thickness of 3 nm was stacked on the Ru layer as a second non-magnetic metal layer $7b$ positioned at the upper side, to form the non-magnetic metal layer 7.

When milling rates for the Ru layer and CrTi layer are relatively represented with the milling rate for NiFe as 1, the milling rate $R_1$ for the Ru layer positioned at the lower layer is 1.03, and the milling rate $R_2$ for the CrTi layer positioned at the upper layer is 0.64. Therefore, the relationship $R_2 < R_1$ is met. In addition, the milling rate for NiFe can be considered to correspond to the average milling rate $R_0$ for the MR part. Therefore, the relationship $R_2 < R_0 \leq R_1$ is met.

Moreover, the ratio $t2/t1=3/20=0.15$, where t1 is the film thickness of the first non-magnetic metal layer of Ru, and t2 is the film thickness of the second non-magnetic metal layer.

Further, at the rear part of the MR part shown in Table 1, a permanent magnet made of CoPt was positioned as the orthogonalizing bias function part 90 (see FIG. 2) that influences the substantial orthogonalization of the magnetic directions of the first and second ferromagnetic layers.

Detailed processes for producing such an element are as discussed below. The explanation of the film structure is simplified for ease of understanding.

Figure 12A:
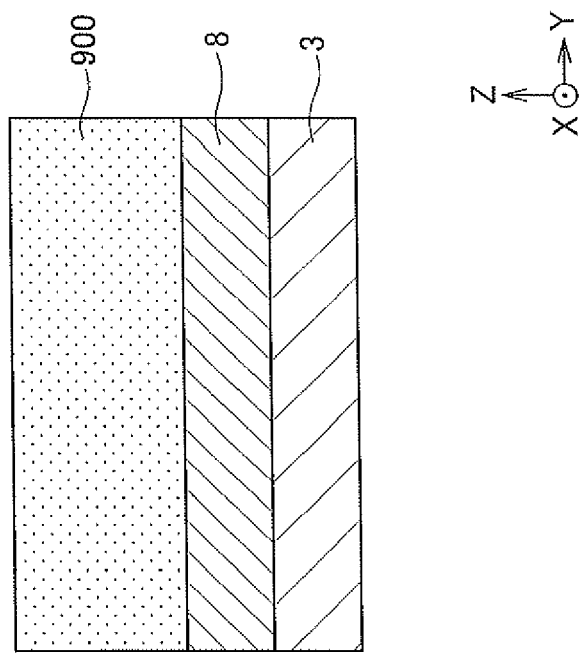
FIG. 12A is an X-Z plan view seen from the medium opposing surface for explaining the production process of the MR element.
Figure 12B:
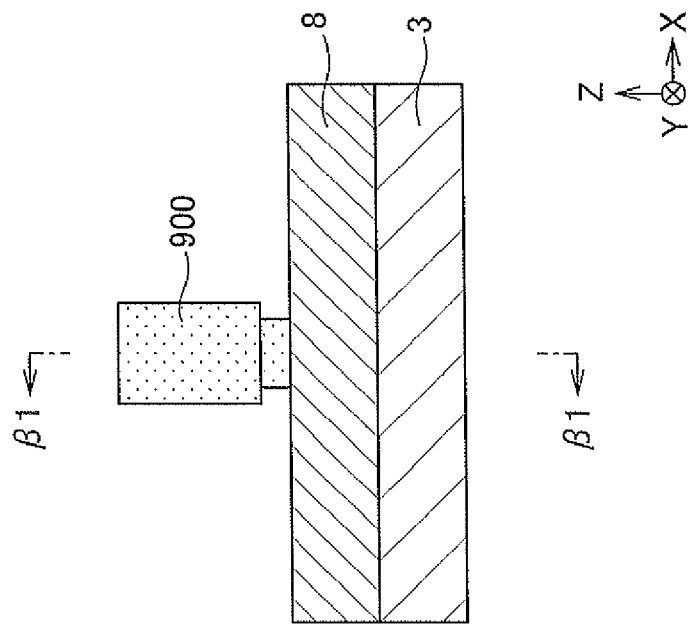
FIG. 12B is a cross sectional view seen from the arrow β1-β1 in FIG. 12A.

As shown in FIGS. 12A and 12B (FIG. 12B is a cross sectional view seen from the arrow β1-β1 in FIG. 12A), a multilayer film of the MR part 8 that includes the dual free layer (DFL) was formed on the first shield layer 3, and the resist pattern 900 was formed on the multilayer.

Figure 13A:
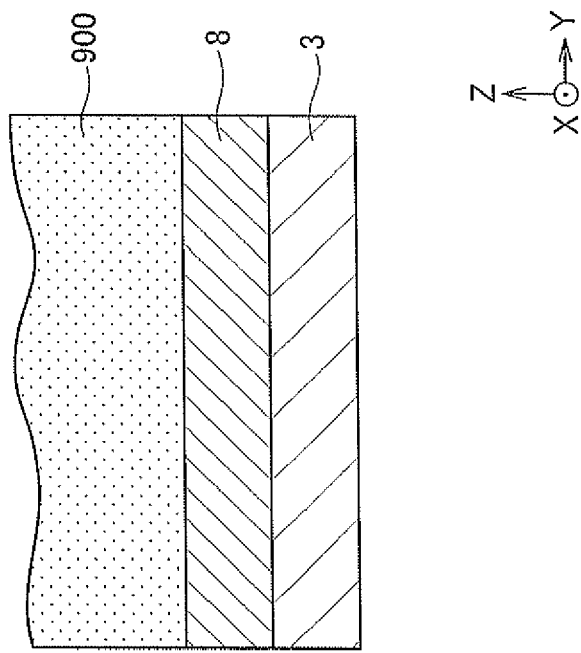
FIG. 13A is an X-Z plan view seen from the medium opposing surface side for explaining the production process of the MR element.
Figure 13B:
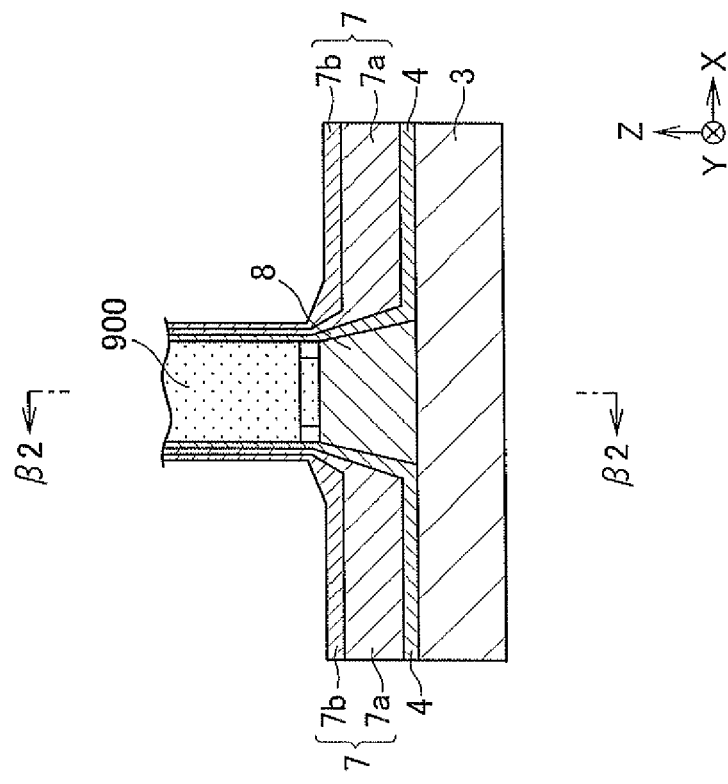
FIG. 13B is a cross sectional view seen from the arrow β2-β2 in FIG. 13A.

Next, with the resist pattern 900 as a mask, the MR part 8 was milled and patterned. As shown in FIGS. 13A and 13B (FIG. 13B is a cross sectional view seen from the arrow β2-β2 in FIG. 13A), the milled indented part was filled to sequentially form the insulation layer 4 (e.g., $Al_2O_3$) and the non-magnetic metal layer 7 configured from a two-layer multilayer (e.g., Ru layer $7a$ and CrTi layer $7b$).

Figures 14A, 14B:
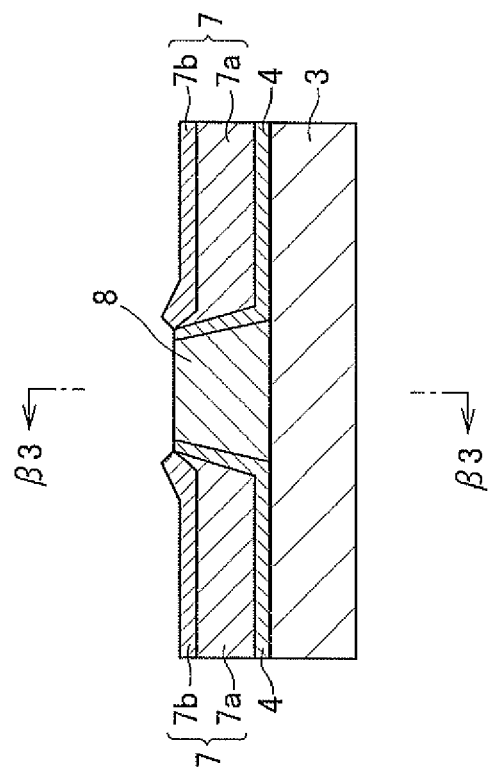
FIG. 14A is an X-Z plan view seen from the medium opposing surface side for explaining the production process of the MR element.
FIG. 14B is a cross sectional view seen from the arrow β3-β3 in FIG. 14A.

The state shown in FIGS. 14A and 14B (FIG. 14B is a cross sectional view seen from the arrow β3-β3 in FIG. 14A) was accomplished after lifting off the resist 900.

Figure 15A:
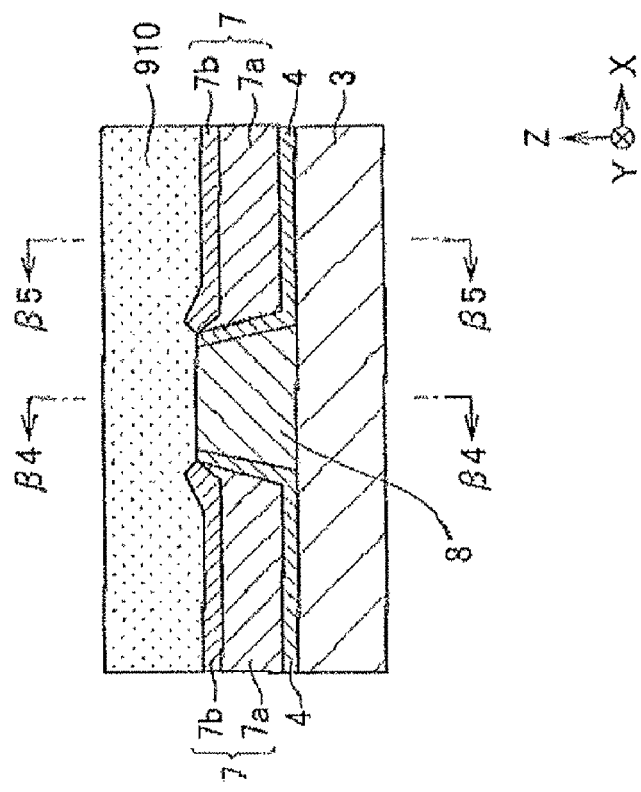
FIG. 15A is an X-Z plan view seen from the medium opposing surface side for explaining the production process of the MR element.
Figure 15B:
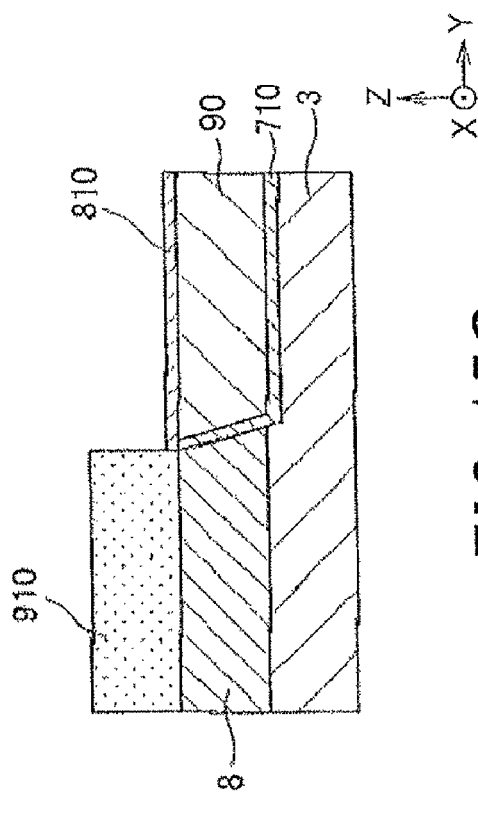
FIG. 15B is a cross sectional view seen from the arrow β4-β4 in FIG. 15A.
Figure 15C:
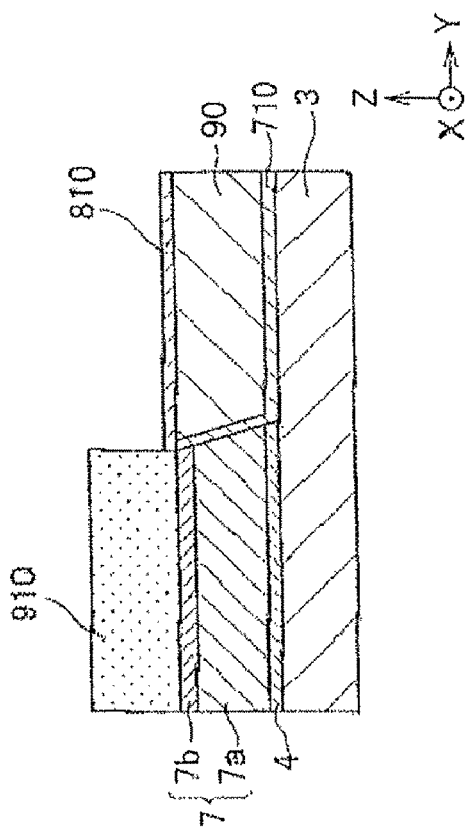
FIG. 15C is a cross sectional view seen from the arrow β5-β5 in FIG. 15A
Figure 18:
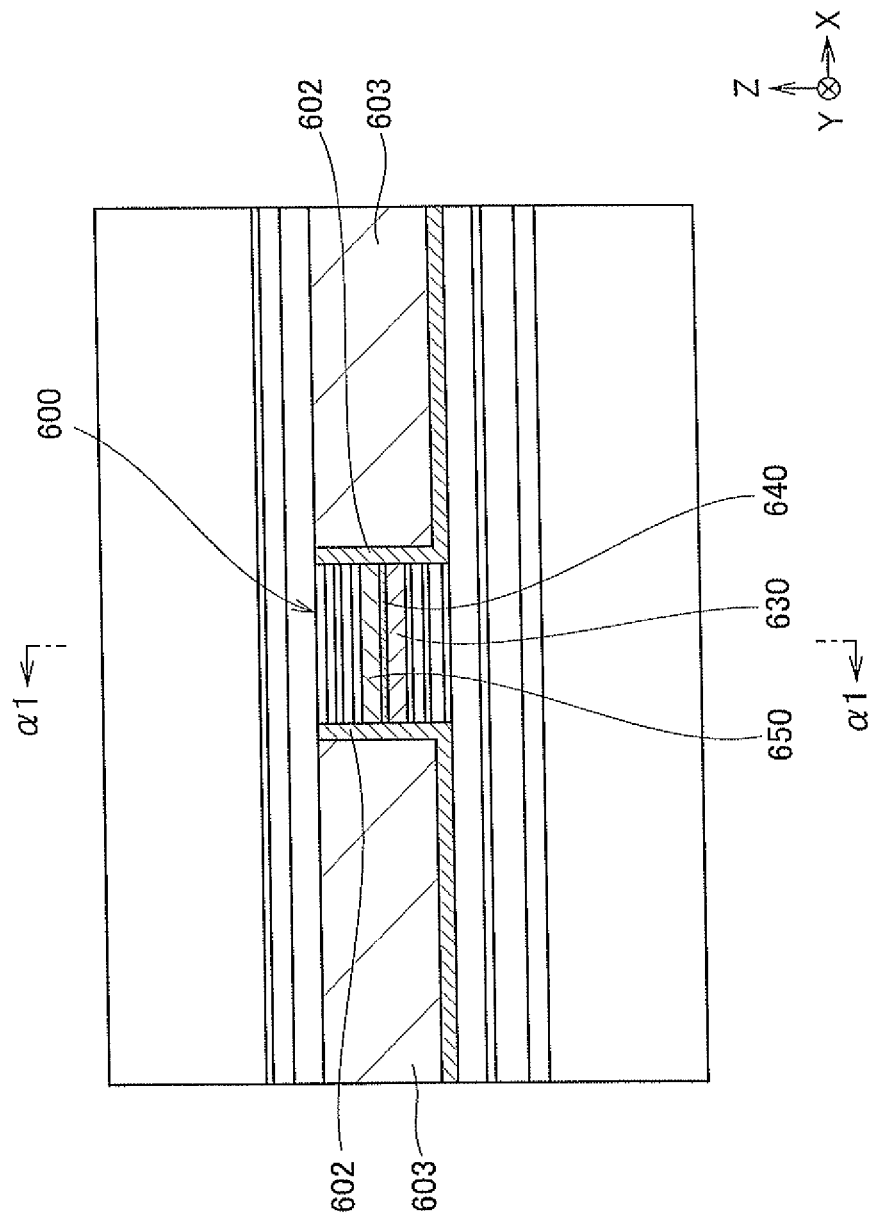
FIG. 18 is a schematic diagram of the conventional magnetoresistive effect element viewed from the medium opposing surface side, which is a diagram showing the ABS end surface.
Figure 19:
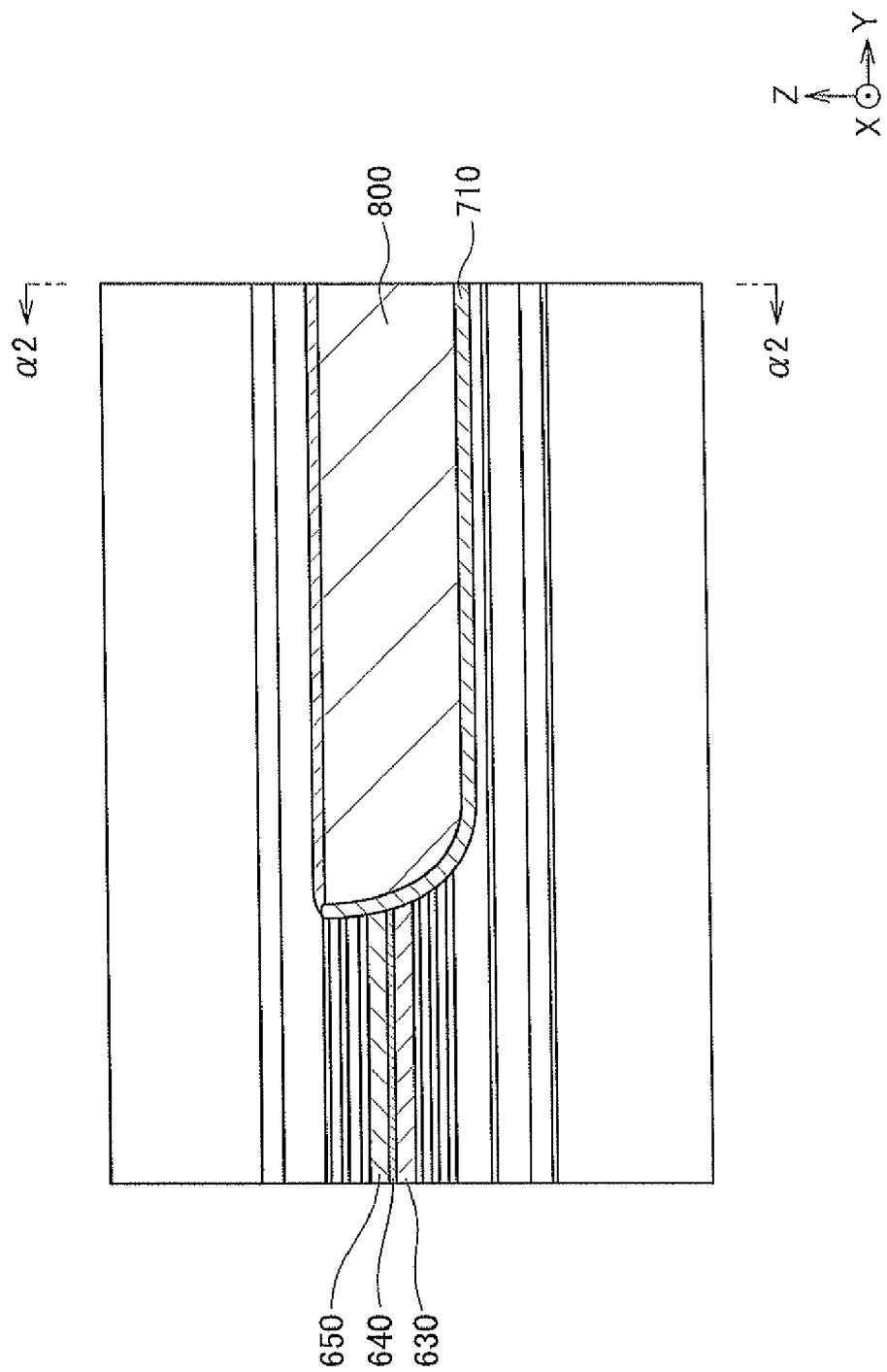
FIG. 19 is a cross sectional view seen from the arrow α1-α1 in FIG. 18.
Figure 20:
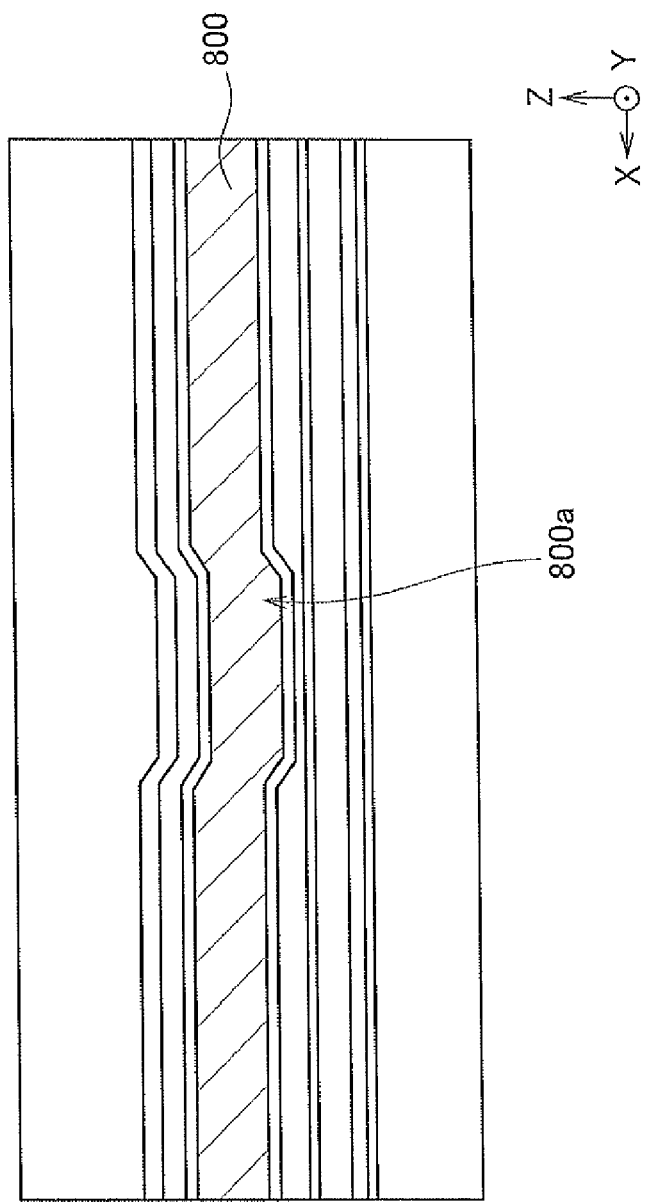
FIG. 20 is an overall view from the rear side viewed from the arrow α2-α2 in FIG. 19.
Figure 21B:
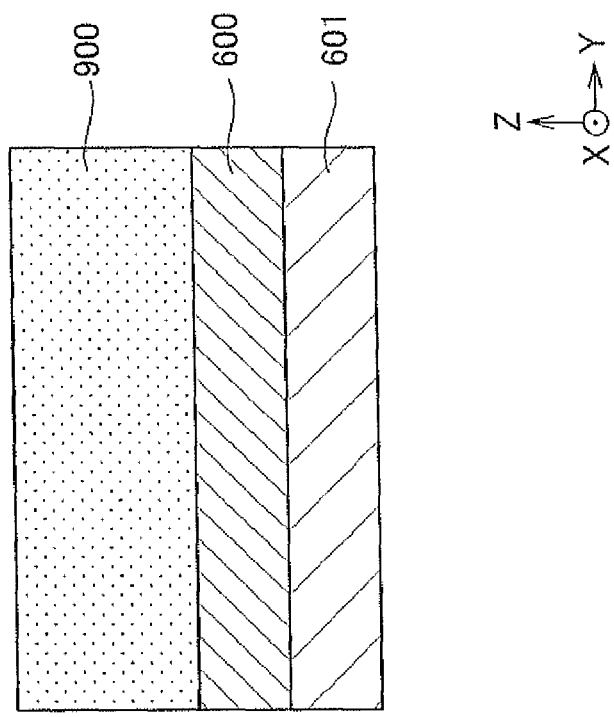
FIG. 21B is a cross sectional view seen from the arrow α3-α3 in FIG. 21A.
Figure 21A:
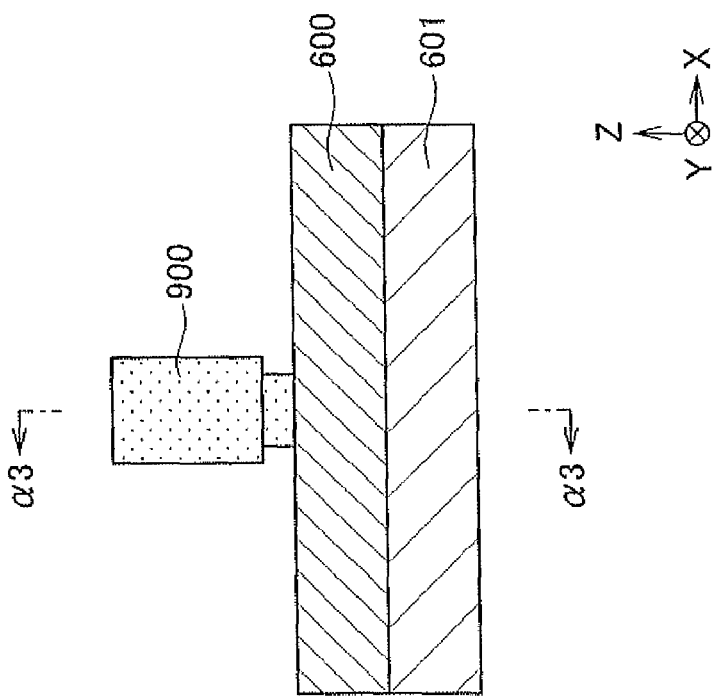
FIG. 21A is an X-Z plan view seen from the medium opposing surface side for explaining the production process of a conventional MR element.
Figure 22B:
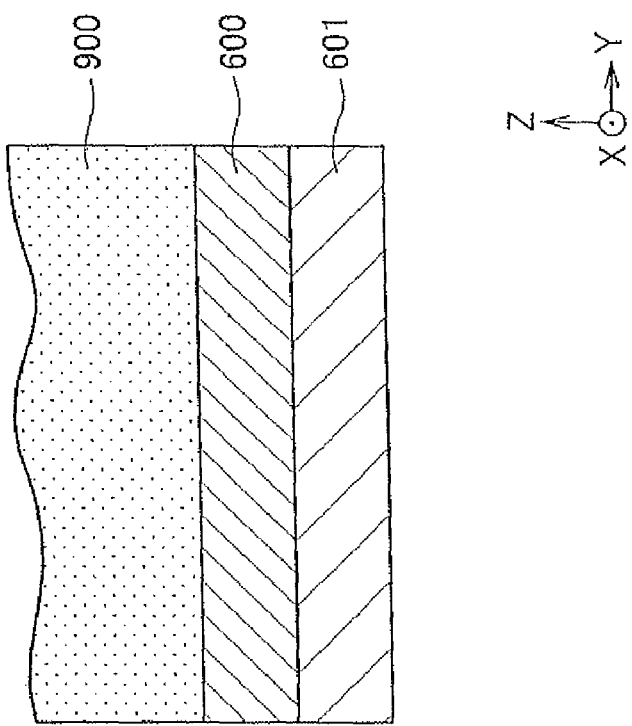
FIG. 22B is a cross sectional view seen from the arrow α4-α4 in FIG. 22A.
Figure 22A:
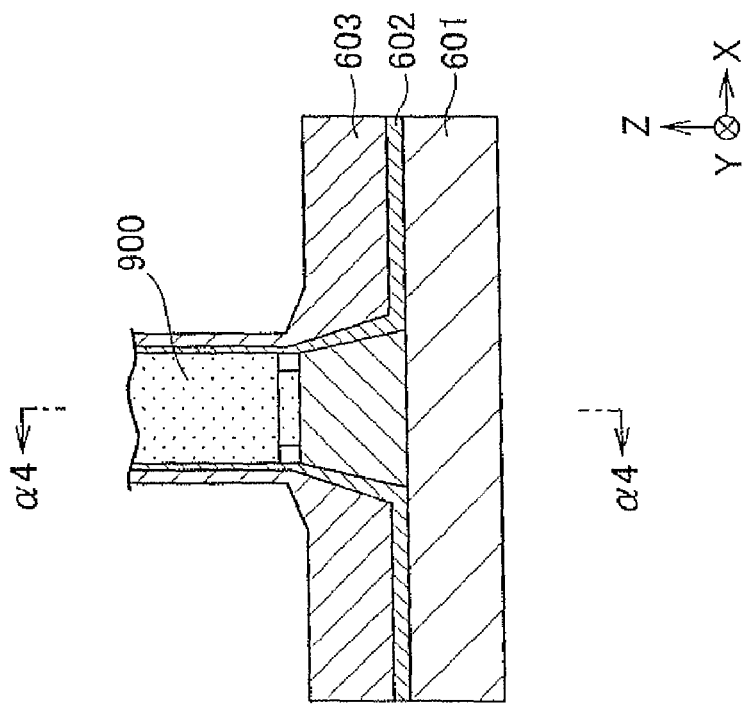
FIG. 22A is an X-Z plan view seen from the medium opposing surface side for explaining the production process of the conventional MR element.
Figure 23B:
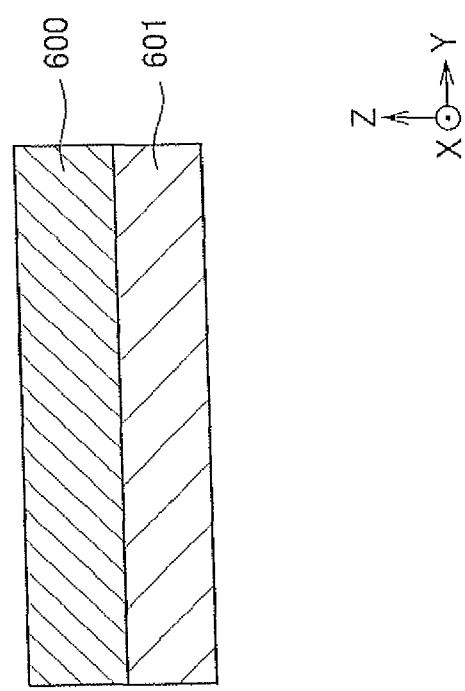
FIG. 23B is a cross sectional view seen from the arrow α5-α5 in FIG. 23A.
Figure 23A:
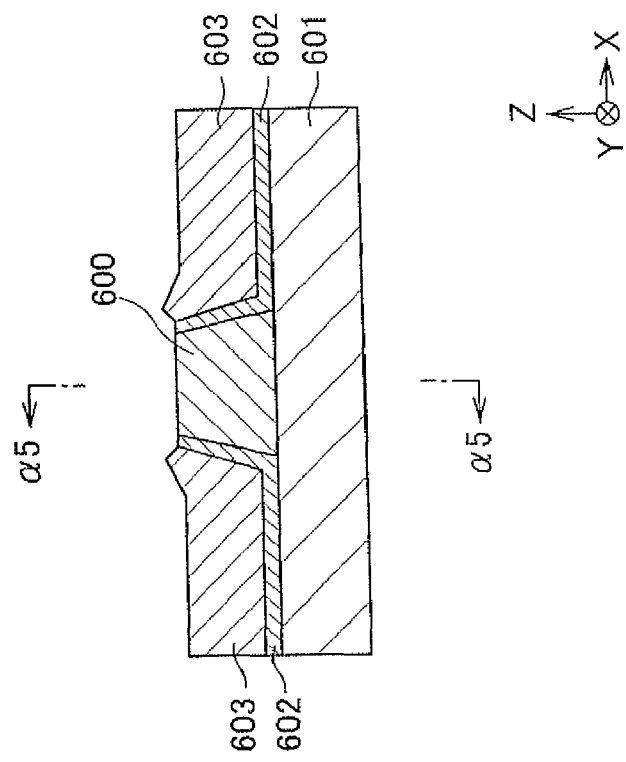
FIG. 23A is an X-Z plan view seen from the medium opposing surface side for explaining the production process of the conventional magnetoresistive effect element.
Figure 24B:
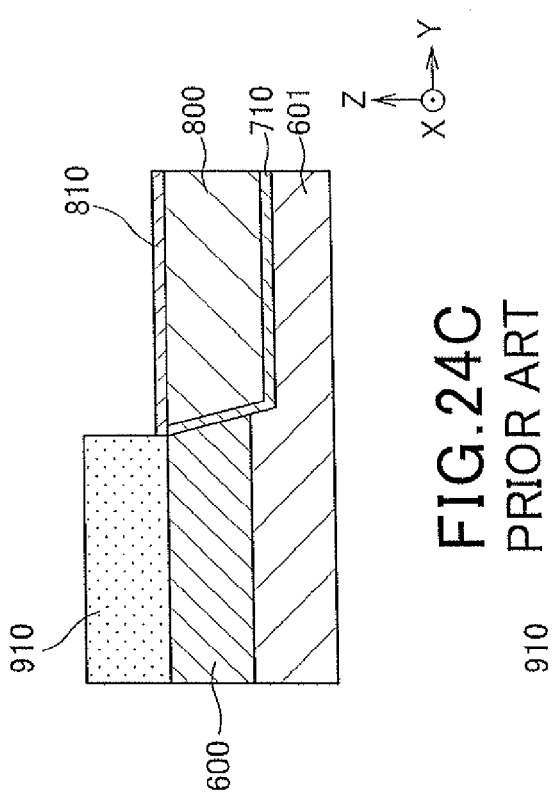
FIG. 24B is a cross sectional view seen from the arrow α6-α6 shown in FIG. 24A.
Figure 24C:
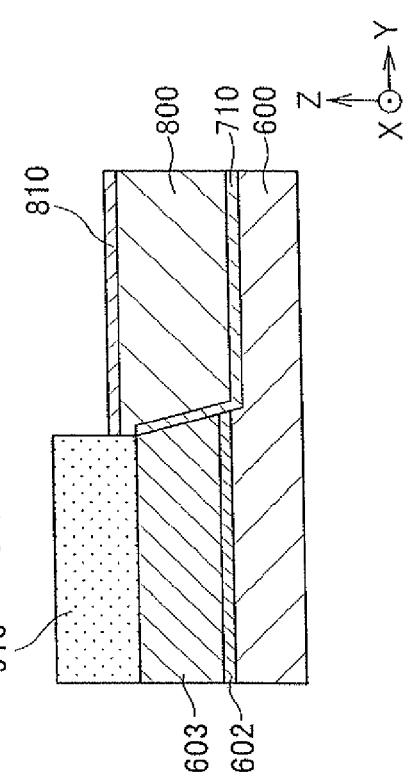
FIG. 24C is a cross sectional view seen from the arrow α7-α7 in FIG. 24A.
Figure 24A:
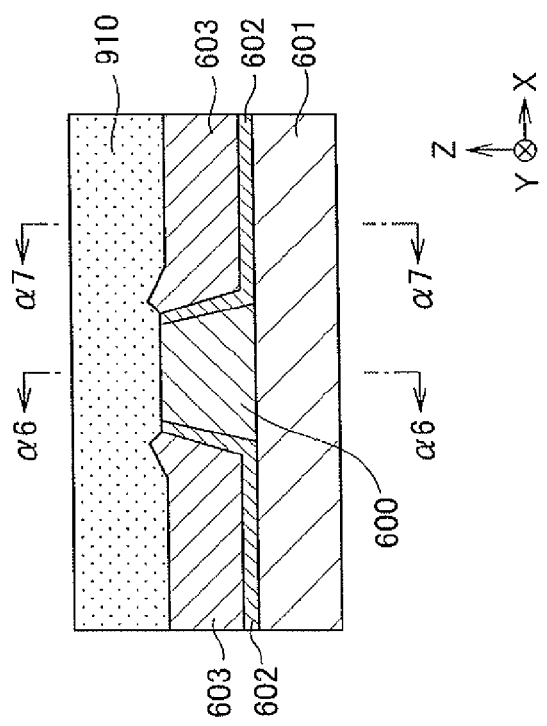
FIG. 24A is an X-Z plan view seen from the medium opposing surface side for explaining the production process of the conventional MR element.
Figure 25:
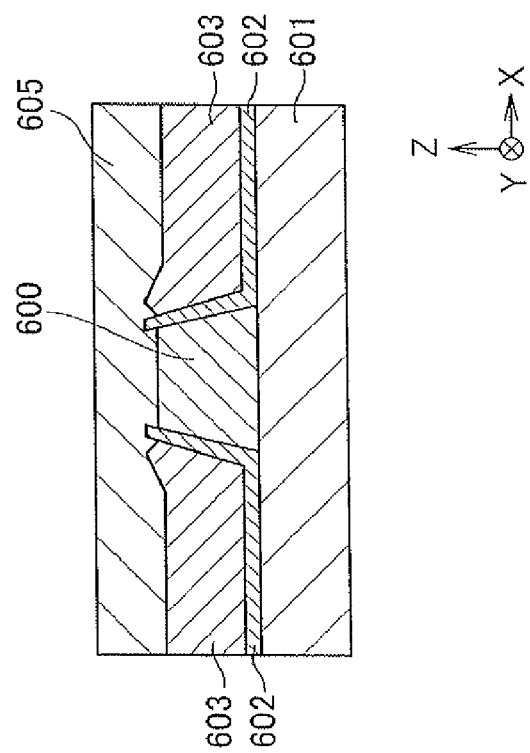
FIG. 25 is an X-Z plan view seen from the medium opposing surface side for explaining the production process of the conventional MR element.
Figure 26:
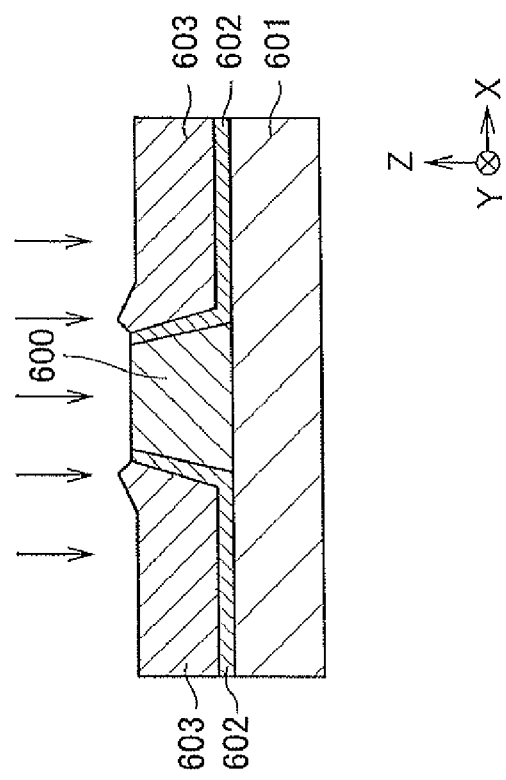
FIG. 26 is an X-Z plan view seen from the medium opposing surface side for explaining the production process of the conventional MR element.

Then, as shown in FIGS. 15A, 15B (FIG. 15B is a cross sectional view seen from the arrow β4-β4 in FIG. 15A), and 15C (FIG. 15C is a cross sectional view seen from the arrow β5-β5 in FIG. 15A), a resist pattern 910 was formed for forming a bias layer at the rear part. With the resist pattern 910 as a mask, a bias magnetic field application layer 90 was formed in the milled part that had been milled. That is, a hard magnet layer 90 on an insulation layer 710 (e.g., $Al_2O_3$) is formed (e.g., a CoPt layer 90 is formed as a hard magnet layer on a Cr base layer). A cap layer 810 (e.g., Cr) is disposed on the surface. Then, the resist 910 was lifted off.

With such a multilayer structure of the present invention (especially, the non-magnetic metal layer $7a$ and $7b$ formed by a two-layer multilayer with the predetermined conditions), when milling the rear part for providing the above-discussed hard magnet layer 90, the milling rates for the non-magnetic metal layer 7 and the MR part 8 having the DFL element part became approximately the same, and thereby the milling depths became the same. As a result, the flatness of the hard magnet layer 90 that is filled in the indented part became excellent.

Moreover, as shown in FIG. 16, after forming the hard magnet layer 90 at the rear part, and after performing the ion beam etching for cleaning the entire upper formation surface of the element prior to forming the upper shield layer, the second shield layer 5 was formed (FIG. 17).

With such a sample of Embodiment 1 (size of the element is 40 nm for both the width and the depth), an Asym-average and Asym-σ (asymmetry-sigma) were measured based on isolated reproducing waveforms with the following factors.

Asym-average and Asym-σ (deviation σ of asymmetric variations of reproducing waveform)

A quasi-static test (QST) was performed on the MR element. The applied magnetic field was 400 Oe, the measurement voltage was 140 mV.

An average of the asymmetric variations (Asym-average) and a σ of asymmetric variations (Asym-σ) of the obtained reproducing waveform were determined.

Larger values mean larger asymmetric variations of the reproducing waveform.

The variations are considered to originate mainly from the inconsistent state of the orthogonalizing bias from the hard magnet layer (CoPt layer 90) positioned at the rear part of the element.

Results are shown in Table 2 below.

Embodiment 2

Producing Sample of Embodiment 2

To form the non-magnetic metal layer 7, an Ru layer with a thickness of 20 nm was formed as the first non-magnetic metal layer 7a positioned at the lower side as a lower layer, and a CrTi layer with a thickness of 2 nm was layered thereon as the second non-magnetic metal layer 7b positioned at the upper side. The sample for Embodiment 2 was otherwise produced in the same manner as that for the sample of Embodiment 1.

The same characteristics evaluations as the case of Embodiment 1 were performed on the sample of Embodiment 2. Results are shown in Table 2 below.

Embodiment 3

Producing Sample of Embodiment 3

To form the non-magnetic metal layer 7, an Ru layer with a thickness of 15 nm was formed as the first non-magnetic metal layer 7a positioned at the lower side as a lower layer, and a CrTi layer with a thickness of 2 nm was layered thereon as the second non-magnetic metal layer 7b positioned at the upper side. The sample for Embodiment 3 was otherwise produced in the same manner as that for the sample of Embodiment 1.

The same characteristics evaluations as the case of Embodiment 1 were performed on the sample of Embodiment 3. Results are shown in Table 2 below.

Embodiment 4

Producing Sample of Embodiment 4

To form the non-magnetic metal layer 7, an Ru layer with a thickness of 15 nm was formed as the first non-magnetic metal layer 7a positioned at the lower side as a lower layer, and a CrTi layer with a thickness of 3 nm was layered thereon as the second non-magnetic metal layer 7b positioned at the upper side. The sample for Embodiment 4 was otherwise produced in the same manner as that for the sample of Embodiment 1.

The same characteristics evaluations as the case of Embodiment 1 were performed on the sample of Embodiment 4. Results are shown in Table 2 below.

Comparative Example 1

Producing Sample of Comparative Example 1

The material for the non-magnetic metal layer 7 in the above-discussed production of the sample of Embodiment 1 was replaced with a single layer of CrTi (thickness: 23 nm). The sample for Comparative Example 1 was otherwise produced in the same manner as that for the sample of Embodiment 1.

The same characteristics evaluations as the case of Embodiment 1 were performed on the sample of Comparative Example 1. Results are shown in Table 2 below.

With the single layer of CrTi as the material for the non-magnetic metal layer 7, both the milling rate and the ion beam etching rate for the layer were reduced, and it was confirmed that flattening the hard magnet layer 90 is difficult. The results were obtained with a single layer of Cr as the material for the non-magnetic metal layer 7.

Comparative Example 2

Producing Sample of Comparative Example 2

The material for the non-magnetic metal layer 7 in the above-discussed production of the sample of Embodiment 1 was replaced with a single layer of Ru (thickness: 23 nm). The sample for Comparative Example 1 was otherwise produced in the same manner as that for the sample of Embodiment 1.

The same characteristics evaluations as the case of Embodiment 1 were performed on the sample of Comparative Example 2. Results are shown in below Table 2.

With the single layer of Ru as the material for the non-magnetic metal layer 7, the ion beam etching rate for the layer was extremely large, and therefore, the layer was milled too much. As such, the second shield layer that is formed thereon was not made flat, and the bias magnetic field from the hard magnet layer 90 was leaked to the shield layer. As such, it was confirmed that effects of the bias from the hard magnet layer 90 were reduced.

TABLE 2

| | Non-magnetic metal layer 7 | | | |
|---|---|---|---|---|
| Sample No. | Thickness (nm) of first non-magnetic metal layer 7a of Ru | Thickness (nm) of second non-magnetic metal layer 7b of CrTi | Asym Ave. | Asym-σ |
| Embodiment 1 | 20 | 3 | 4% | 10% |
| Embodiment 2 | 20 | 2 | 4% | 10% |
| Embodiment 3 | 15 | 2 | 5% | 10% |
| Embodiment 4 | 15 | 3 | 5% | 10% |
| Comparative 1* | 0 | 23 | 7% | 13% |
| Comparative 2* | 0 | 23 | 8% | 15% |

From the comparison of results from Embodiments 1-4 and Comparative Examples 1 and 2 as shown in Table 2, the effects of the present invention are clear.

Namely, an MR element in a current perpendicular to plane (CPP) structure of the present invention includes a magnetoresistive effect part (MR part), and a first shield layer and a second shield layer formed to sandwich the MR part from above and below, in which a sense current is applied in a lamination direction of the MR part. Wherein, the MR part has a non-magnetic intermediate layer, a first ferromagnetic layer functioning as a free layer and a second ferromagnetic layer functioning as a free layer, the first and second ferromagnetic layers being layered to sandwich the non-magnetic intermediate layer, an orthogonalizing bias function part is formed at a rear part of the MR part influencing a substantial orthogonalizing function of the first and second ferromagnetic layers in respective magnetization directions thereof, non-magnetic metal layers are formed to abut both ends of the MR part in a width direction and are separated from both ends of the MR part by respective insulation layers, each of the non-magnetic metal layers is in a two-layer structure configured with a first non-magnetic metal layer positioned at a lower side as a lower layer and a second non-metal layer positioned at an upper side as an upper layer, and a relationship $R_2 < R_1$ is met, where $R_1$ is a milling rate for the first non-magnetic metal layer that is the lower layer, and $R_2$ is another milling rate for the second non-magnetic metal layer that is the upper layer. Thereby, flatness of the orthogonalizing bias function part of the hard magnet layer positioned at the rear part of the magnetoresistive effect element having two free layers is maintained, and fine bias effect is maintained. Also, unnecessary magnetic flux is prevented from leaking to the upper shield, realizing that the fluctuation of a QST (quasi-static test) waveform is improved.

As a possibility of usage of the present invention in the industry, the present invention can be used in the industry of magnetic disk devices that include an MR element for reading, as a signal, magnetic field intensity from magnetic recording mediums and the like.

What is claimed is:

1. A magnetoresistive effect element (MR element) in a current perpendicular to plane (CPP) structure comprising:
   a magnetoresistive effect part (MR part), and
   a first shield layer and a second shield layer formed to sandwich the MR part from above and below, in which a sense current is applied in a lamination direction of the MR part, wherein
   the MR part has a non-magnetic intermediate layer, a first ferromagnetic layer functioning as a free layer and a second ferromagnetic layer functioning as a free layer, the first and second ferromagnetic layers being layered to sandwich the non-magnetic intermediate layer,
   an orthogonalizing bias function part is formed at a rear part of the MR part influencing a substantial orthogonalizing function of the first and second ferromagnetic layers in respective magnetization directions thereof,
   non-magnetic metal layers are formed to abut both ends of the MR part in a width direction and are separated from both ends of the MR part by respective insulation layers,
   each of the non-magnetic metal layers is in a two-layer structure configured with a first non-magnetic metal layer positioned at a lower side as a lower layer and a second non-metal layer positioned at an upper side as an upper layer, and
   a relationship $R_2 < R_1$ is met, where $R_1$ is a milling rate for the first non-magnetic metal layer that is the lower layer, and $R_2$ is another milling rate for the second non-magnetic metal layer that is the upper layer.

2. The MR element according to claim 1, wherein
   a relationship $R_2 < R_0 \leq R_1$ is met,
   where $R_0$ is an average milling rate for the MR part, $R_1$ is the milling rate for the first non-magnetic metal layer that is the lower layer, and $R_2$ is the milling rate for the second non-magnetic metal layer that is the upper layer.

3. The MR element according to claim 1,
   each of the first and second shield layers further having a part in which the magnetization direction is controlled by an antiferromagnetic layer embedded in each of the first and second shield layers, wherein
   the first and second ferromagnetic layers are under an antiparallel magnetization state in which the respective magnetization directions are influenced to become opposite from each other due to an effect of the parts in which the magnetization directions are controlled.

4. The MR element according to claim 1, wherein
   a ratio $t2/t1$ is in a range from 0.04 to 0.36,
   where $t1$ is a film thickness of the first non-magnetic metal layer, and $t2$ is a film thickness of the second non-magnetic metal layer.

5. The MR element according to claim 4, wherein
   a total thickness of $t1$ and $t2$ is 15-30 nm.

6. The MR element according to claim 1, wherein
   the first non-magnetic metal layer is formed of Ru, and the second non-magnetic metal layer is formed of either Cr or Cr alloy.

7. The MR element according to claim 6, wherein
   the second non-magnetic metal layer is formed of CrTi.

8. The MR element according to claim 1, wherein
   the magnetization directions of the first and second ferromagnetic layers are antiparallel in the width direction when an influence of the orthogonalizing bias function part is removed.

9. A thin film magnetic head, comprising:
   a medium opposing surface that faces a recording medium;
   the MR element according to claim 1, the MR element being positioned near the medium opposing surface to detect a signal magnetic field from the recording medium; and
   a pair of electrodes to transmit an electric current in the lamination direction of the MR element.

10. A head gimbal assembly, comprising:
    a slider including the thin film magnetic head according to claim 9 and positioned to face the recording medium; and
    a suspension that elastically supports the slider.

11. A magnetic disk device, comprising:
    a slider including the thin film magnetic head according to claim 9 and positioned to face the recording medium; and
    a positioning device that supports and positions the slider with respect to the recording medium.

* * * * *